US008851219B2

(12) United States Patent
Yoshida et al.

(10) Patent No.: US 8,851,219 B2
(45) Date of Patent: Oct. 7, 2014

(54) MOVING BODY

(71) Applicants: Naohiro Yoshida, Nisshin (JP);
Toshiyuki Kondo, Tiryu (JP); Masahiko
Hibino, Toyota (JP); Osamu Yumita,
Nagoya (JP); Yoshihiro Funayama,
Toyota (JP)

(72) Inventors: Naohiro Yoshida, Nisshin (JP);
Toshiyuki Kondo, Tiryu (JP); Masahiko
Hibino, Toyota (JP); Osamu Yumita,
Nagoya (JP); Yoshihiro Funayama,
Toyota (JP)

(73) Assignee: Toyota Jidosha Kabushiki Kaisha,
Toyota-Shi (JP)

( * ) Notice: Subject to any disclaimer, the term of this
patent is extended or adjusted under 35
U.S.C. 154(b) by 0 days.

(21) Appl. No.: 13/656,160

(22) Filed: Oct. 19, 2012

(65) Prior Publication Data
US 2013/0149617 A1 Jun. 13, 2013

Related U.S. Application Data

(62) Division of application No. 12/683,643, filed on Jan. 7, 2010, now abandoned, which is a division of application No. 10/569,450, filed as application No. PCT/JP2004/011868 on Aug. 12, 2004, now abandoned.

(30) Foreign Application Priority Data

Aug. 26, 2003 (JP) .................................. 2003-301311
Oct. 27, 2003 (JP) .................................. 2003-366502
May 25, 2004 (JP) .................................. 2004-154091

(51) Int. Cl.
B60L 11/18 (2006.01)

(52) U.S. Cl.
USPC ........................................................ 180/65.31

(58) Field of Classification Search
USPC .............. 180/65.1, 65.31; 280/847, 851, 156,
280/157, 853; 903/908, 951; 429/414
See application file for complete search history.

(56) References Cited

U.S. PATENT DOCUMENTS

| 1,486,222 | A | 3/1924 | Berry |
| 3,279,818 | A | 10/1966 | Jones |
| 3,695,679 | A | 10/1972 | Wilfert |
| 3,768,394 | A | 10/1973 | Powlesland |
| 3,834,732 | A | 9/1974 | Schons |

(Continued)

FOREIGN PATENT DOCUMENTS

DE 100 65 306 A1 7/2002
EP 1 265 305 A2 12/2002

(Continued)

OTHER PUBLICATIONS

Office Action mailed Jan. 29, 2009 in grand parent U.S. Appl. No. 10/569,450.

(Continued)

Primary Examiner — Frank Vanaman
(74) Attorney, Agent, or Firm — Kenyon & Kenyon LLP

(57) ABSTRACT

A moving body, such as a vehicle, having one or more fuel cells mounted thereon. The fuel cells, which power the moving body, generate electricity and release water as a by-product. Accordingly, the moving body includes a water discharge module that releases water produced by the fuel cells to the atmosphere using a water outlet. The water outlet may be located in a front section of the moving body. The moving body may further include a water tank that temporarily stores water before releasing the water to the atmosphere.

3 Claims, 36 Drawing Sheets

(56) References Cited

U.S. PATENT DOCUMENTS

| | | | |
|---|---|---|---|
| 3,869,617 A * | 3/1975 | Gaussoin et al. | 280/851 |
| 4,192,522 A | 3/1980 | Morgan | |
| 4,318,510 A | 3/1982 | Koike | |
| 4,372,570 A | 2/1983 | Goodall | |
| 4,478,718 A | 10/1984 | Saget | |
| 4,660,846 A | 4/1987 | Morin | |
| 4,850,868 A | 7/1989 | Wright et al. | |
| 4,855,192 A | 8/1989 | Grasso | |
| 4,858,941 A * | 8/1989 | Becker | 280/851 |
| 5,000,483 A | 3/1991 | Bluemel et al. | |
| 5,277,444 A | 1/1994 | Stropkay | |
| 5,460,420 A | 10/1995 | Perkins et al. | |
| 5,487,565 A | 1/1996 | Thompson | |
| 5,662,184 A | 9/1997 | Riemer et al. | |
| 5,961,148 A | 10/1999 | Cheng | |
| 6,057,051 A | 5/2000 | Uchida et al. | |
| 6,124,052 A | 9/2000 | Katoh et al. | |
| 6,467,698 B2 | 10/2002 | Gaarder et al. | |
| 6,598,914 B1 | 7/2003 | Dixon | |
| 6,719,328 B2 * | 4/2004 | Szakurski | 280/848 |
| 6,745,948 B1 | 6/2004 | Hidaka et al. | |
| 6,869,469 B2 | 3/2005 | Grover et al. | |
| 2002/0066606 A1 | 6/2002 | Nakamori | |
| 2002/0094469 A1 | 7/2002 | Yoshizumi et al. | |
| 2003/0037983 A1 | 2/2003 | Hanaya et al. | |

FOREIGN PATENT DOCUMENTS

| | | |
|---|---|---|
| JP | S5967177 A | 4/1984 |
| JP | S63172215 U | 4/1987 |
| JP | 08-195215 | 7/1996 |
| JP | 09-266002 | 10/1997 |
| JP | 11-204126 | 7/1999 |
| JP | 2001-229938 A | 8/2001 |
| JP | 2001-313056 | 11/2001 |
| JP | 2002-280046 A | 9/2002 |
| JP | 2002-289237 | 10/2002 |
| JP | 2002-373691 A | 12/2002 |
| JP | 2002-373697 A | 12/2002 |
| JP | 2003-007323 | 1/2003 |
| JP | 2003023705 A | 1/2003 |
| WO | 98/16402 A1 | 4/1998 |

OTHER PUBLICATIONS

Office Action mailed Aug. 7, 2009 in grand parent U.S. Appl. No. 10/569,450.
Office Action mailed Apr. 18, 2011 in parent U.S. Appl. No. 12/683,643.
Office Action mailed Apr. 2, 2012 in parent U.S. Appl. No. 12/683,643.
Office Action dated Oct. 11, 2013, in U.S. Appl. No. 13/798,666.
Office Action dated Oct. 25, 2013, in U.S. Appl. No. 13/826,049.
Office Action mailed on Mar. 14, 2014 in U.S. Appl. No. 13/798,666.
Office Action mailed on Mar. 17, 2014 in U.S. Appl. No. 13/826,049.
Advisory Action dated Jun. 30, 2014, in U.S. Appl. No. 13/798,666.
Advisory Action dated Jun. 12, 2014, in U.S. Appl. No. 13/826,049.

* cited by examiner

MOVING BODY

This is a division of application Ser. No. 12/683,643 filed 7 Jan. 2010, which is a division of application Ser. No. 10/569,450 filed 24 Feb. 2006, which is a 371 national phase application of PCT/JP2004/011868 filed 12 Aug. 2004, claiming priority to Japanese Patent Applications No. 2003-301311 filed 26 Aug. 2003, No. 2003-366502 filed 27 Oct. 2003, and No. 2004-154091 filed 25 May 2004, the contents of which are incorporated herein by reference.

FIELD OF THE INVENTION

The present invention relates to a moving body. Specifically, the invention relates to a moving body with fuel cells that are mounted thereon as a power source and generate electric power with production of water as a by-product

BACKGROUND OF THE INVENTION

One example of proposed moving bodies is a motorcycle that releases water produced by fuel sells on the side of the vehicle (see, for example, Japanese Patent Laid-Open Gazette No. 2001-313056). Release of the water produced by the fuel cells on the side of the vehicle prevents potential troubles caused by splash of the water on wheels, for example, a skid of the wheels.

A proposed technique to reduce the concentration of remaining hydrogen contained in exhaust gas from the fuel cells provides a baffle plate in the vicinity of an outlet of an exhaust pipe to accelerate diffusion of the exhaust gas (see, for example, Japanese Patent Laid-Open Gazette No. 2002-289237). Various techniques may be applied to release of water. For example, the water may be released with exhaust gas through an exhaust conduit or may be released from the bottom of the vehicle after gas liquid separation in a gas-liquid separator.

SUMMARY OF THE INVENTION

As described above, the vehicle with fuel cells mounted thereon requires release of water, which is produced by the fuel cells, out of the vehicle during a run. Even when the water is released in such a manner that does not wet wheels to avoid a potential skid, the released water may cause some troubles on subsequent and nearby vehicles. For example, the released water may be swirled on and scattered by the vehicle wind and be splashed on the front glass of a subsequent vehicle. The release of the water in a lateral direction, however, may cause the released water to swash on a pedestrian on the road shoulder or a nearby building.

The object of the present invention is to provide a moving body which restrains potential disadvantage of making the released water, which is released from the fuel cells of the moving body, swirled and scattered. The object of the invention is also to provide a moving body which restrains potential disadvantage of making the released water splash on any pedestrians and nearby buildings. The object of the invention is also to provide a moving body which restrains potential effect of the released water in a lateral direction or backward of the moving body.

In order to achieve at least part of the aforementioned objects, the moving body of the present invention is constructed as follows.

A first moving body of the present invention is a moving body with fuel cells that are mounted thereon as a power source and generate electric power with production of water as a by-product, the moving body including a water discharge module that releases water produced by the fuel cells from a water outlet located in a front section of the moving body to the atmosphere.

In the first moving body of the invention, the water produced by the fuel cells is released from the water outlet located in the front section of the moving body to the atmosphere. This arrangement desirably reduces splash of the released water in a lateral direction or backward of the moving body by the effects of the air flow caused by motion of the moving body. Here the terminology 'moving body' includes any ground moving body, for example, an automobile, a train, or any of other various vehicles. The moving body may have other power sources, such as a secondary battery and a capacitor, in addition to the fuel cells.

In one preferable application of the invention, the first moving body is a vehicle, and the water outlet is located at either of a bumper and a fender in a front section of the vehicle. The water is thus released from the position of the front bumper or the front fender.

In this application of the invention where the water outlet is located at either the bumper or the fender in the front section of the vehicle, it is preferable that the water outlet is located ahead of a front wheel of the vehicle. The vicinity of the wheel has little potential effects of the vehicle wind caused by a run of the vehicle. This arrangement thus effectively restrains scatter of the water.

In one preferable embodiment of this application of the invention where the water outlet is located at either the bumper or the fender in the front section of the vehicle, the first moving body further includes a water tank that is located in the front section of the vehicle to temporarily keep the water accumulated therein and is arranged in a pathway from the fuel cells to the water outlet for releasing the water to the atmosphere. The water is temporarily accumulated in the water tank, for example, to be released at a stop of the vehicle or to be released at a fixed rate. This arrangement effectively reduces splash of the water in the lateral direction or backward of the vehicle, compared with the structure without such function of water accumulation. In this embodiment of the invention, the water tank may be located inside the bumper of the vehicle. This allows for effective use of the inside space of the bumper. The water tank may alternatively be located ahead of the water outlet. This saves the required space for piping from the water tank to the water outlet.

A second moving body of the present invention is a moving body with fuel cells that are mounted thereon as a power source and generate electric power with production of water as a by-product, the moving body including: a water discharge module that releases water produced by the fuel cells from a water outlet to the atmosphere; and an air flow regulation module that regulates an air flow caused by motion of the moving body in a neighborhood of the water outlet of the water discharge module.

In the second moving body of the invention, the air flow caused by the motion of the moving body is regulated in the vicinity of the water outlet for releasing the water produced by the fuel cells. This arrangement effectively prevents scatter of the water. This arrangement restrains potential disadvantage of the released water in a lateral direction or backward of the moving body. Here the terminology 'moving body' includes any ground moving body, for example, an automobile, a train, or any of other various vehicles. The moving body may have other power sources, such as a secondary battery and a capacitor, in addition to the fuel cells.

In one preferable embodiment of the second moving body of the invention, the water outlet is arranged to release the water from a bottom side of the moving body substantially downward in a vertical direction. The air flow regulation module makes the air flow obliquely backward the moving body. When the moving body is at a stop, the water is released in the vertical direction from the side of the moving body in the range of the contour of the moving body. This arrangement desirably prevents the released water from splashing about on any pedestrian or any building or construction on the side of the moving body, when the moving body is at a stop. During a motion of the moving body, on the other hand, the regulated air flow makes the released water flown obliquely backward the moving body. This arrangement restrains the released water from being swirled on and scattered by the air flow caused by the motion of the moving body, thus reducing the adverse effects of the water splash on other vehicles running on the side and behind. The lateral distance of the water released obliquely backward depends upon the flow rate of the water and the moving speed of the moving body. The release angle of the water in the obliquely backward direction is preferably regulated to make the lateral distance of the water release in a generally non-approachable range during the motion of the moving body, for example, in a range of 10 to 100 cm or more specifically in a range of 30 to 70 cm. This desirably prevents the released water during the motion of the moving body from splashing about on any pedestrian or construction on the side of the moving body. Here and in the specification hereof, the terminology 'obliquely backward' direction includes the lateral direction, the backward direction, as well as all directions between the lateral direction and the backward direction, that is, all the backward directions in the angle of 0 to 90 degrees from the lateral direction of the moving body. The air flow regulation module may be designed to make the air flow backward at an angle in a range of 15 to 75 degrees relative to a lateral side of the moving body.

In the embodiment of the second moving body of the invention that makes the air flow obliquely backward the moving body, it is preferable that the air flow regulation module regulates the air flow to have a vertically downward component. This arrangement accelerates fall of the water onto the road surface, thus more effectively restraining backward scatter of the released water.

In the embodiment of the second moving body of the invention that makes the air flow obliquely backward the moving body, it is also preferable that the air flow regulation module regulates the air flow introduced from front of the moving body. The air flow introduced from the front of the moving body is thus utilized for regulation of the water release.

In one preferable application of this embodiment of the invention that makes the air flow obliquely backward the moving body, the second moving body is a vehicle, and the water outlet is located behind a front wheel of the vehicle. The vicinity of the wheel has little potential effects of the vehicle wind caused by a run of the vehicle. This arrangement thus effectively reduces the potential effects of the vehicle wind on the water released from the water outlet, thus preventing scatter of the released water backward and in the lateral direction.

In the embodiment of the second moving body of the invention that makes the air flow obliquely backward the moving body, the water outlet may be located on a side of a driver's seat. The side of the driver's seat is generally the side closer to the opposing vehicles. This arrangement thus effectively prevents the water released obliquely backward from splashing about on any pedestrian walking on the road shoulder.

A third moving body of the present invention is a moving body with fuel cells that are mounted thereon as a power source and generate electric power with production of water as a by-product, the moving body being equipped with a suspension device for supporting the moving body, the moving body including a water discharge module that has a water outlet attached to an under-spring member of the suspension device and releases water produced by the fuel cells from the water outlet to the atmosphere.

In the third moving body of the invention, water produced by the fuel cell is released from the water outlet attached to the under-spring member of the suspension device to the atmosphere. Release of water at the position closer to the road surface shortens the time required for the fall of water to the road surface and thereby restrains splash of the water by the air flow caused by the motion of the moving body. Thus, this arrangement restrains potential disadvantage of the released water in a lateral direction or backward of the moving body. Here the terminology 'moving body' includes any ground moving body, for example, an automobile, a train, or any of other various vehicles. The moving body may have other power sources, such as a secondary battery and a capacitor, in addition to the fuel cells. The under-spring member may be a suspension arm.

In one preferable application of the invention, the third moving body is a vehicle, and the water outlet is located in a neighborhood of a wheel. The vicinity of the wheel has little potential effects of the vehicle wind caused by a run of the vehicle. This arrangement thus effectively reduces the potential effects of the vehicle wind on the water released from the water outlet, thus preventing scatter of the released water backward and in the lateral direction. The water outlet may be located behind a rear wheel.

In one preferable embodiment of the invention, the third moving body has an air flow regulation module that regulates an air flow caused by motion of the moving body in the vicinity of the water outlet. This structure preferably controls the potential effects of the air flow caused by the motion of the moving body on the released water. In one structure of the embodiment of the third moving body of the invention, the air flow regulation module restricts the air flow caused by the motion of the moving body. In another structure of the embodiment, the air flow regulation module regulates the air flow to have a vertically downward component. The former structure reduces the effect of the air flow by the motion of the moving body on the water, and the latter structure shortens the time required for the fall of water to the road surface, thus effectively restraining splash of the water A fourth moving body of the present invention is a moving body with fuel cells that are mounted thereon as a power source and generate electric power with production of water as a by-product, the moving body including: a water discharge module that releases water produced by the fuel cells from a water outlet to the atmosphere; and an air flow effect control module that restrains potential effect of an air flow caused by motion of the moving body on the water, which is released from the water outlet and eventually reaches road surface, at least in a neighborhood of the water outlet.

The fourth moving body of the invention restrains the potential effects of the air flow caused by the motion of the moving body on the water, which is released from the water outlet and eventually reaches road surface, at least in the neighborhood of the water outlet. This arrangement desirably restrains splash of the released water by the air flow caused by the motion of the moving body. This arrangement restrains potential disadvantage of the released water in a lateral direction or backward of the moving body. Here the terminology 'moving body' includes any ground moving body, for example, an automobile, a train, or any of other various vehicles. The moving body may have other power sources, such as a secondary battery and a capacitor, in addition to the fuel cells.

In the fourth moving body of the invention, the air flow effect control module may generate a gas flow in the neighborhood of the water outlet to flow in a direction substantially identical with a release direction of the water from the water outlet. The gas flow interferes with the air flow caused by the motion of the moving body and thereby restricts the potential effects of the air flow caused by the motion of the moving body on the released water.

In the fourth moving body of the invention, the air flow effect control module may generate a gas flow to practically block off the air flow, which is caused by the motion of the moving body to affect the water released from the water outlet. The gas flow interferes with the air flow caused by the motion of the moving body to affect the released water and thereby restricts the potential effects of the air flow caused by the motion of the moving body on the released water.

In the fourth moving body of the invention that generates the gas flow to restrict the potential effects of the air flow caused by the motion of the moving body on the released water, it is preferable that the air flow effect control module generates the gas flow ahead of a release position of the water in a moving direction of the moving body. This arrangement restrains the potential effects of the front air flow on the released water.

In the fourth moving body of the invention that generates the gas flow in the direction substantially identical with the release direction of the water, the air flow effect control module may generate the gas flow behind a release position of the water in a moving direction of the moving body. The gas flow generated behind the released water effectively restrains the potential effects of the air flow on the release water.

In the fourth moving body of the invention that generates the gas flow in the direction substantially identical with the release direction of the water, the air flow effect control module may generate the gas flow laterally inward a release position of the water in a moving direction of the moving body or may alternatively generate the gas flow laterally outward the release position of the water in the moving direction of the moving body. The gas flow generated on the side of the released water effectively restrains the potential effects of the air flow on the release water.

In the fourth moving body of the invention that generates the gas flow to restrict the potential effects of the air flow caused by the motion of the moving body on the released water, the air flow effect control module may generate the gas flow in a circular shape around the water or may generate the gas flow to surround the water. The gas flow generated in the circular shape around the water or the gas flow generated to surround the water desirably restrains the potential effects of the air flow on the released water.

In the fourth moving body of the invention that generates the gas flow to restrict the potential effects of the air flow caused by the motion of the moving body on the released water, the air flow effect control module may generate the gas flow of exhaust gas from the moving body. For example, the air flow effect control module may generate the gas flow of exhaust gas from the fuel cells. This ensures the effective use of the exhaust gas from the fuel cells. The air flow effect control module may have a fan to generate the gas flow. The fan is, for example, a cooling fan to cool down a device mounted on the moving body. This arrangement ensures the effective use of the exhaust gas from the fan, which is applied to cool down the device mounted on the moving body. The fan may be arranged in a lower portion of the moving body to make a flow of the exhaust gas having a vertically downward component.

In the fourth moving body of the invention that generates the gas flow to restrict the potential effects of the air flow caused by the motion of the moving body on the released water, it is preferable that the air flow effect control module regulates the air flow caused by the motion of the moving body to generate the gas flow. This arrangement attains the effective use of the air flow caused by the motion of the moving body.

A fifth moving body of the present invention is a moving body with fuel cells that are mounted thereon as a power source and generate electric power with production of water as a by-product, the moving body including: a water discharge module that releases water produced by the fuel cells from a water outlet to the atmosphere; and a backward scatter control module that restrains water released from the water outlet and water reaching road surface after the release from the water outlet from being scattered backward by an air flow caused by motion of the moving body.

The fifth moving body of the invention restrains water released from the water outlet and water reaching road surface after the release from the water outlet from being scattered backward by the air flow caused by the motion of the moving body. This arrangement desirably restricts scatter of the released water in the lateral direction and backward. The terminology 'moving body' includes any ground moving body, for example, an automobile, a train, or any of other various vehicles. The moving body may have other power sources, such as a secondary battery and a capacitor, in addition to the fuel cells.

In one preferable embodiment of the fifth moving body of the invention, the backward scatter control module generates a gas flow behind the water outlet to flow in a direction substantially identical with a release direction of the water from the water outlet. The gas flow effectively reduces the potential effects of the air flow caused by the motion of the moving body on the water released from the water outlet and the water reaching the road surface.

In another preferable embodiment of the fifth moving body of the invention, the backward scatter control module generates a gas flow having a vertically downward component behind the water outlet. The gas flow effectively restrains backward scatter of the water released from the water outlet and the water reaching the road surface.

In another preferable embodiment of the fifth moving body of the invention, the backward scatter control module regulates the air flow caused by the motion of the moving body to generate the gas flow. This ensures the effective use of the air flow by the motion of the moving body.

In still another preferable embodiment of the fifth moving body of the invention, the backward scatter control module generates the gas flow of exhaust gas from the moving body. In this case, the backward scatter control module may generate the gas flow of exhaust gas from the fuel cells. This ensures the effective use of the exhaust gas from the fuel cells.

A sixth moving body of the present invention is a moving body with fuel cells that are mounted thereon as a power source and generate electric power with production of water as a by-product, the moving body including a gas liquid separation discharge module that receives a supply of exhaust gas including at least part of water produced by the fuel cells in the form of steam, effects gas liquid separation of the supplied exhaust gas by function of centrifugal separation, and releases separated gas and liquid in a substantially identical direction to the atmosphere.

The sixth moving body of the invention receives a supply of exhaust gas including at least part of water produced by the fuel cells in the form of steam, effects gas liquid separation of the supplied exhaust gas by function of centrifugal separation, and releases the separated gas and liquid in a substantially identical direction to the atmosphere. The gas released with the liquid in the substantially identical direction works as a gas flow to restrict the potential effects of the air flow caused by the motion of the moving body on the liquid. The gas flow accordingly prevents backward or lateral scatter of the liquid or the released water. This arrangement desirably restricts scatter of the released water in the lateral direction and backward. The gas separated by gas liquid separation is not restricted to the completely dried gas but may be imperfectly saturated, perfectly saturated, or oversaturated steam-containing gas or a gas containing very small liquid water droplets in addition to such steam. The terminology 'moving body' includes any ground moving body, for example, an automobile, a train, or any of other various vehicles. The moving body may have other power sources, such as a secondary battery and a capacitor, in addition to the fuel cells.

In one preferable embodiment of the sixth moving body of the invention, the gas liquid separation discharge module includes: a gas liquid separator module that makes a spiral flow of the exhaust gas to effect the centrifugal gas liquid separation; and a release module that releases the gas and the liquid separated by the gas liquid separator module in a direction having a vertically downward component. Here the terminology 'making a spiral flow' means revolving in spirals. The gas liquid separator module makes a spiral flow of the exhaust gas and applies the centrifugal force on the weight of the water to accumulate the water on the inner wall surface. The release module utilizes the gas flow to move the water accumulated on the inner wall surface toward the rear portion and releases the accumulated water in the direction having the vertically downward component. The gas separated by gas liquid separation is accordingly released as the gas flow ahead of the released water. The gas flow effectively restricts the potential effects of the air flow caused by the motion of the moving body on the released water and thereby prevents backward and lateral scatter of the released water. In this preferable embodiment, the release module may have a bent pipe, which bends a substantially horizontal flow of the gas and the liquid from the gas liquid separator module to a vertically downward direction and releases the vertically downward flow of the gas and the liquid.

A seventh moving body of the present invention is a moving body with fuel cells that are mounted thereon as a power source and generate electric power with production of water as a by-product, the moving body including a release module having a release mechanism that changes a release direction of exhaust gas in a range between a vertically downward direction and a horizontal direction, in response to a variation in flow rate of the exhaust gas from the fuel cells. The release module activates the release mechanism to release water and the exhaust gas produced by the fuel cells to the atmosphere.

The seventh moving body of the invention activates the release mechanism that changes the release direction of the exhaust gas in the range between the vertically downward direction and the horizontal direction, in response to a variation in flow rate of the exhaust gas from the fuel cells. The release module releases the water and the exhaust gas produced by the fuel cells to the atmosphere. The release direction of the exhaust gas is adjustable, in response to the flow rate of the exhaust gas discharged from the fuel cells.

The release mechanism may change the release direction of the exhaust gas to the horizontal direction, in response to an increase in flow rate of the exhaust gas. The flow rate of the exhaust gas naturally increases with an increase in load applied to the fuel cells. The load of the fuel cells is affected by the moving speed or the moving acceleration of the moving body. The water and the exhaust gas are released downward in the vertical direction, in response to a low moving speed or a low moving acceleration of the moving body. The water and the exhaust gas are released in the direction between the vertically downward direction and the horizontal direction, on the other hand, in response to a high moving speed or a high moving acceleration of the moving body. The terminology 'moving body' includes any ground moving body, for example, an automobile, a train, or any of other various vehicles. The moving body may have other power sources, such as a secondary battery and a capacitor, in addition to the fuel cells.

In one preferable embodiment of the seventh moving body of the invention, the release mechanism changes the release direction of the exhaust gas from the vertically downward direction to a horizontal and lateral direction of the moving body, in response to a variation in flow rate of the exhaust gas from the fuel cells. Under the condition of a high moving speed or a high moving acceleration of the moving body, the water and the exhaust gas are released in the direction having the lateral component of the moving body. This arrangement effectively prevents the released water from being swirled on and scattered by the air flow caused by the motion of the moving body.

In another preferable embodiment of the seventh moving body of the invention, the release mechanism changes the release direction of the exhaust gas from the vertically downward direction to a horizontal and backward direction of the moving body, in response to a variation in flow rate of the exhaust gas from the fuel cells. Under the condition of a high moving speed or a high moving acceleration of the moving body, the water and the exhaust gas are released in the direction having the backward component of the moving body. The release of water in the direction having the backward component lowers the relative speed of the released water to the road surface and thus restrains splash of water against the road surface. This arrangement accordingly prevents the released water from being splashed against the road surface to be swirled on and scattered by the air flow caused by the motion of the moving body.

In another preferable embodiment of the seventh moving body of the invention, the release mechanism has a movable pipe that is linked via a hinge to an upper edge of an end of a stationary pipe fixed to the moving body in a substantially horizontal orientation. In still another preferable embodiment of the seventh moving body, the release mechanism has a bendable pipe that is linked in a bendable manner to an end of a stationary pipe fixed to the moving body in a substantially horizontal orientation, and a deformable elastic member that is deformable by force of a gas flowing through the bendable pipe. In this embodiment, the release mechanism utilizes the deformable elastic member to adjust a bending state of the bendable pipe and make a free end of the bendable pipe face substantially downward in the vertical direction, in response to a low flow rate of the exhaust gas.

An eighth moving body of the present invention is a moving body with fuel cells that are mounted thereon as a power source and generate electric power with production of water as a by-product, the moving body including: a water discharge module that releases water produced by the fuel cells from a water outlet to the atmosphere; and a scatter control module that restrains scatter of the water released from the water outlet of the water discharge module.

The eighth moving body of the invention restrains scatter of the water produced by the fuel cells and released from the water outlet and thus desirably restricts scatter of the released water in the lateral direction and backward. Here the terminology 'moving body' includes any ground moving body, for example, an automobile, a train, or any of other various vehicles. The moving body may have other power sources, such as a secondary battery and a capacitor, in addition to the fuel cells.

In one preferable embodiment the eighth moving body of the invention, the scatter control module enhance a force in a direction acting on fall of the water. The enhanced force in the direction acting on the fall of the water accelerates the fall of the released water to the road surface and thereby prevents the released water from being swirled on and scattered by the air flow caused by the motion of the moving body, before reaching the road surface.

In this embodiment of the eighth moving body of the invention that enhances the force in the direction acting on the fall of the water, the scatter control module may increase a fall weight of the water. Here the terminology 'increasing the fall weight' means aggregation of small water droplets to form larger water droplets when the released water falls in the form of water droplets, while meaning expansion of the sectional area of water when the released water falls in a continuous flow. In this case, as one structure, the scatter control module may accumulate the water and lead the accumulated water to the water outlet. The scatter control module may further effect gas liquid separation of exhaust gas from the fuel cells, which includes at least part of the water in the form of steam, to accumulate the water.

In the embodiment of the eighth moving body of the invention that enhances the force in the direction acting on the fall of the water, the scatter control module may accelerate the fall of the water with an air flow caused by motion of the moving body. This ensures effective use of the air flow caused by the motion of the moving body to restrain splash of the released water. In the embodiment of the eighth moving body of the invention that enhances the force in the direction acting on the fall of the water, further, the scatter control module may make the air flow caused by the motion of the moving body as a flow having a vertically downward component relative to the water, so as to accelerate the fall of the water. This structure also ensures effective use of the air flow caused by the motion of the moving body to restrain splash of the released water.

In the embodiment of the eighth moving body of the invention that enhances the force in the direction acting on the fall of the water, the scatter control module may accelerate the fall of the water with a flow of a gas emitted from the moving body. This ensures effective use of the gas emitted from the moving body to restrain splash of the released water. In this case, the scatter control module may emit the gas flow from the moving body as a flow having a vertically downward component relative to the water, so as to accelerate the fall of the water.

In another preferable embodiment of the eighth moving body of the invention, the scatter control module reduces a force in a direction acting on splash of the water. The reduced force in the direction acting on the splash of the water effectively restrains scatter of the released water.

In this preferable embodiment, the scatter control module may restrict effect of an air flow caused by motion of the moving body on the water. Scatter of the released water is thus restrained with the air flow by the motion of the moving body.

In the embodiment of the eighth moving body of the invention that reduces a force in a direction acting on splash of the water, the scatter control module may regulate the air flow caused by the motion of the moving body relative to the water, so as to restrict the effect of the air flow caused by the motion of the moving body on the water. In this case, as one structure, the scatter control module may restrict or block off the air flow caused by the motion of the moving body relative to the water. In this case, as another structure, the scatter control module may make the air flow caused by the motion of the moving body as a flow having a vertically downward component relative to the water.

In the embodiment of the eighth moving body of the invention that reduces a force in a direction acting on splash of the water, the scatter control module may reduce the force with a flow of a gas emitted from the moving body. This ensures the effective use of the gas from the moving body to restrain splash of the released water. In this case, the scatter control module may restrict or block off the air flow caused by the motion of the moving body relative to the water.

In another preferable embodiment of the eighth moving body, the scatter control module restricts motion of the water. Restriction of the motion of the water desirably restrains splash of the released water. In this preferable embodiment, the scatter control module may restrict the motion of the water with a flow of a gas emitted from the moving body, or with an air flow caused by motion of the moving body.

A ninth moving body of the present invention includes: fuel cells that generate electric power through electrochemical reaction of hydrogen with oxygen; an exhaust system that emits exhaust gas from the fuel cells out of the moving body; and a water discharge control mechanism that restrains discharge of water, which is contained in the exhaust gas, out of the moving body at a speed of not lower than a preset level.

Scatter of the released water is affected by the air flow outside the moving body. The ninth moving body of the invention accordingly restrains the discharge of water, which is contained in the exhaust gas, out of the moving body at the speed of not lower than the preset level, thus effectively preventing the scatter of the released water. A typical example of the moving body is a vehicle.

In the ninth moving body of the invention, the water discharge control mechanism may have any of diverse structures. In a first available structure, the water discharge control mechanism is a valve mechanism that reduces an opening at the speed of not lower than the preset level. The valve mechanism may include a solenoid valve and a valve regulator that regulates the opening of the solenoid valve in response to the speed of the moving body. The valve mechanism may alternatively include a lead valve that opens and closes in response to a variation in external pressure. Under the condition of relatively high-speed motion of the moving body, the ram pressure or the pressure caused by the blockage of the air flow increases with an increase in moving speed. The lead valve that opens and closes in response to a variation in ram pressure accordingly actualizes the valve mechanism of the relatively simple structure.

In a second available structure, the water discharge control mechanism is a drain that has an opening at a position and orientation to make a ram pressure produced by motion of the moving body act in a direction of restricting discharge of the water. For example, the drain may be attached to the outside of the moving body to face forward.

The water discharge control mechanism may be located in the exhaust system, for example, set directly in an exhaust pipe. In another preferable embodiment, the exhaust system has a gas liquid separation mechanism to separate the water from the exhaust gas, and the water discharge control mechanism is located in a water discharge system downstream the gas liquid separation mechanism. The gas liquid separation mechanism separates the water from the exhaust gas and thus advantageously ensures efficient discharge of water.

In one preferable structure of this embodiment, the gas liquid separation mechanism has a water tank that temporarily keeps the water accumulated therein. The presence of the water tank desirably restricts discharge of the water under the condition of high-speed motion of the moving body without affecting the function of gas liquid separation. In this structure, it is preferable that the water discharge system is provided in the water tank to have an opening in a front portion of the moving body. Under acceleration of the moving body, the force of inertia functions to press the accumulated water rearward in the water tank and thereby interfere with the water discharge from the water tank to prevent splash of water. Under deceleration of the moving body, on the other hand, the force of inertia functions to press the accumulated water forward in the water tank and thereby facilitate the water discharge from the water tank. The opening of the water tank for water discharge faces the front of the moving body. This simple structure restricts water discharge under acceleration of the moving body, while facilitating water discharge under deceleration of the moving body.

A tenth moving body of the present invention includes: fuel cells that generate electric power through electrochemical reaction of hydrogen with oxygen; an exhaust system that emits exhaust gas from the fuel cells out of the moving body; a water tank that temporarily keeps water contained in the exhaust gas; and a drain that is formed in a front portion of the moving body to discharge the water from the water tank.

The tenth moving body of the invention has the water tank located in the exhaust system and the drain formed in the front portion of the moving body to discharge the water from the water tank. The tenth moving body of the invention may have insufficient effects of restraining the water discharge under the condition of the high-speed motion of the moving body. As mentioned above, the presence of the front-facing opening restricts water discharge under acceleration of the moving body, while facilitating water discharge under deceleration of the moving body. During a general run, the moving body often repeats acceleration and deceleration and does not continue running at a fixed cruising speed. The arrangement of facilitating the water discharge under deceleration and restraining the water discharge under acceleration thus reduces scatter of the discharged water during a run of the moving body to the level that does not interfere with smooth driving of subsequent and nearby moving bodies. Here a typical example of the moving body is a vehicle.

In the tenth moving body of the invention, the water tank and the drain may be located inside the moving body to discharge water out of the moving body through an exhaust pipe. In one preferable embodiment of the tenth moving body of the invention, the drain has an opening at a position and orientation to make a ram pressure produced by motion of the moving body act in a direction of restricting discharge of the water. In one preferable structure of this embodiment, the water tank is attached to the outside of the moving body. This structure ensures application of the ram pressure onto the drain. In another preferable structure of this embodiment, the water tank is located inside the moving body, whereas the drain is formed outside the moving body. Application of the ram pressure onto the drain restricts the water discharge under the condition of the high-speed motion of the moving body and thereby effectively restrains splash of the discharged water.

In another preferable embodiment of the tenth moving body of the invention, the drain has a valve mechanism that reduces an opening at a speed of not less than a preset level. This arrangement also restricts the water discharge under the condition of the high-speed motion of the moving body. The valve mechanism may be the combination of the solenoid valve and the valve regulator or the lead valve, as discussed above with regard to the ninth moving body of the invention.

In still another preferable embodiment of the tenth moving body of the invention, the exhaust system has a gas liquid separation mechanism to separate the water from the exhaust gas. The water tank is located in a water discharge system downstream the gas liquid separation mechanism.

DETAILED DESCRIPTION

Some modes of carrying out the invention are discussed below as preferred embodiments.

A. First Embodiment

Figure 1:
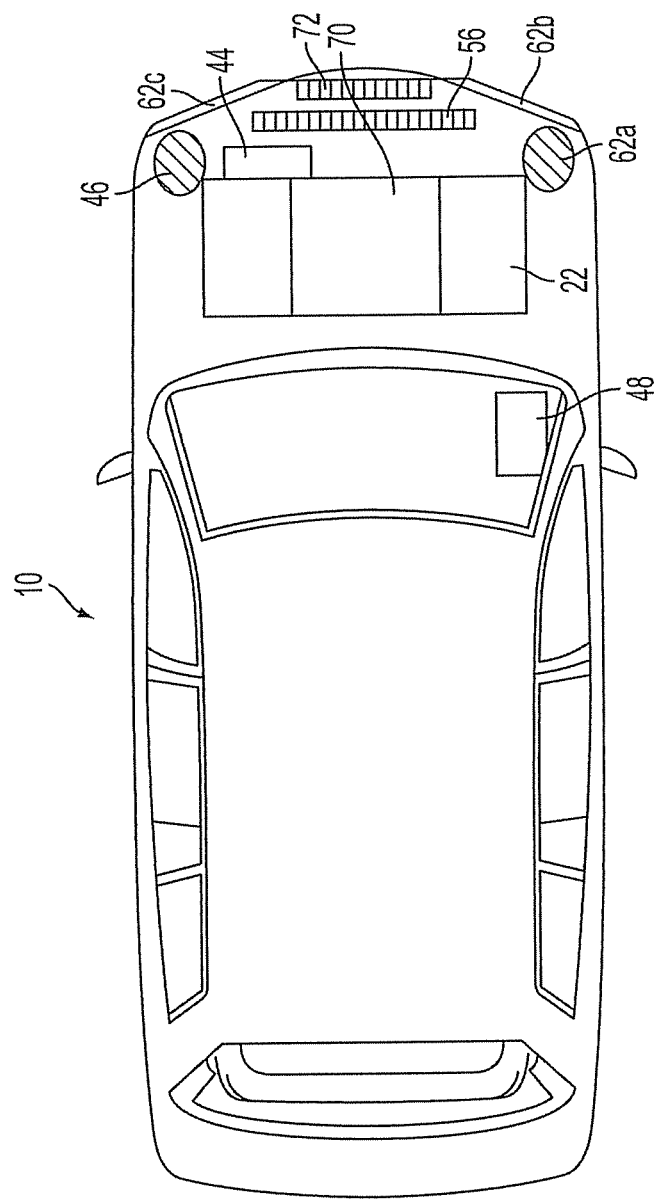
FIG. 1 is a plan view showing a plane layout of devices mounted on a fuel cell vehicle 10 in a first embodiment of the invention.
Figure 2:
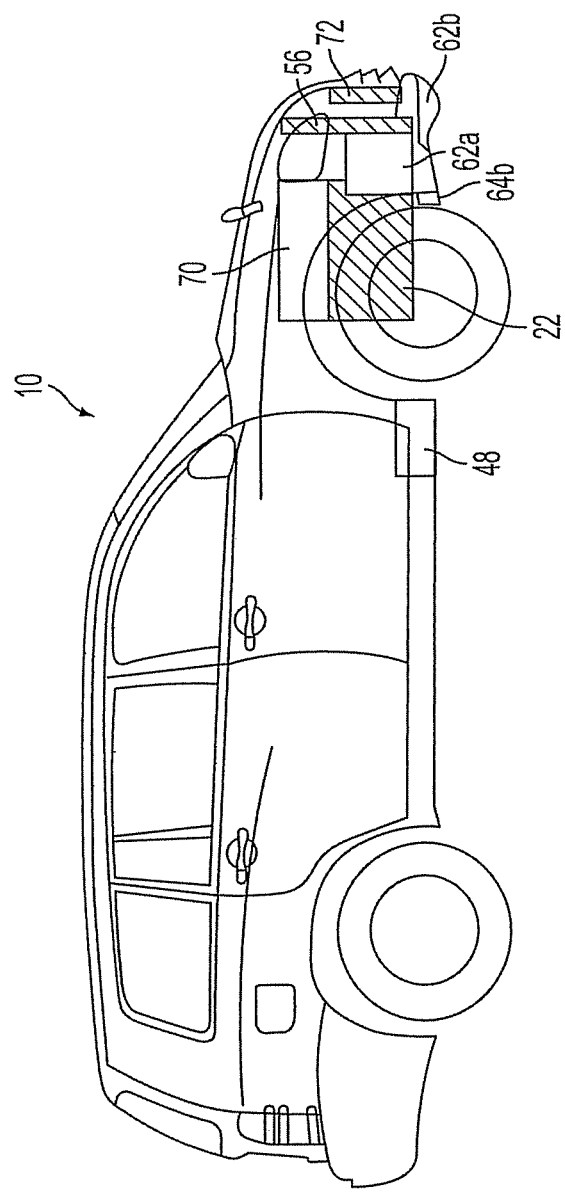
FIG. 2 is a side view showing a side layout of the devices mounted on the fuel cell vehicle 10 of the first embodiment.
Figure 3:
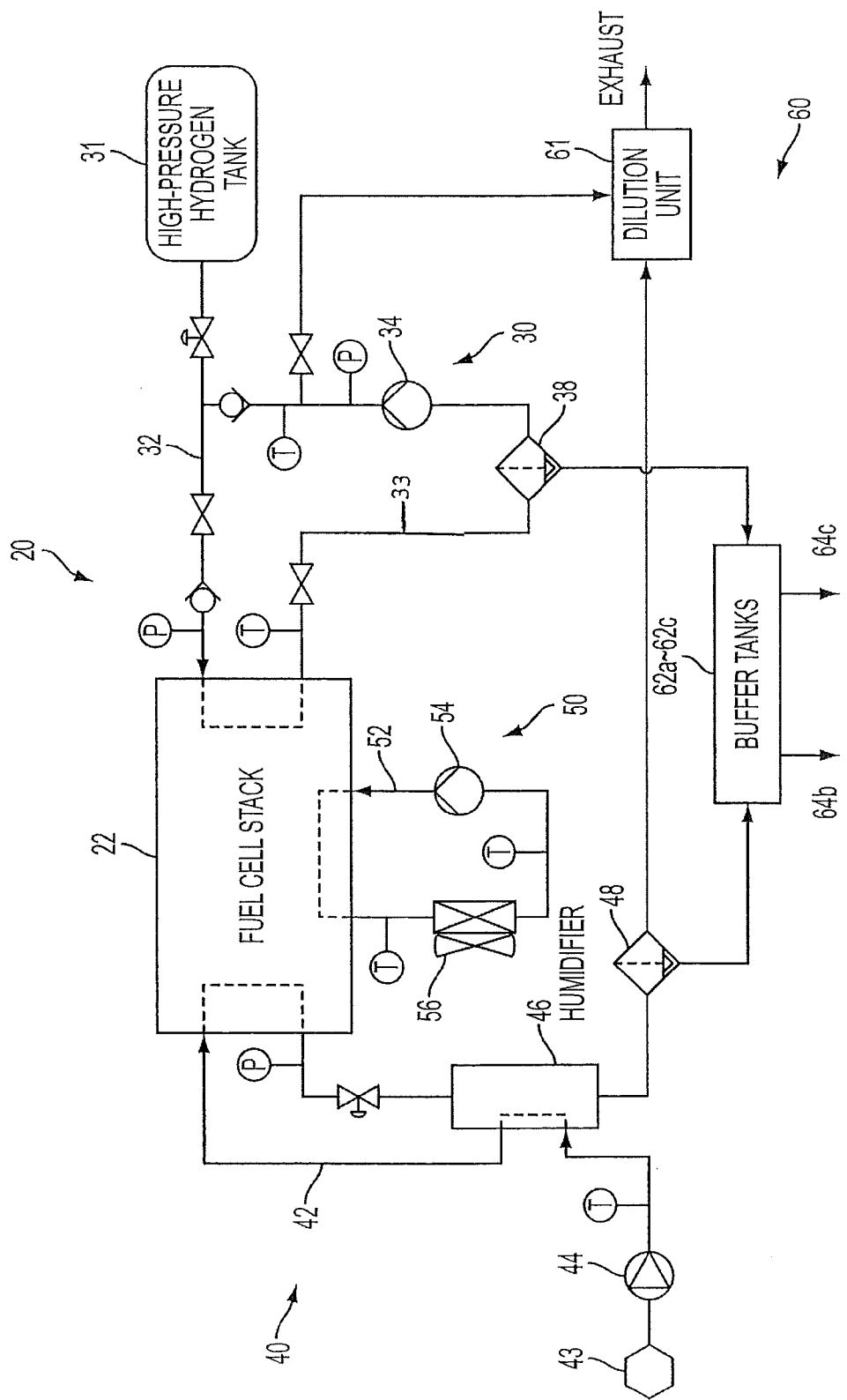
FIG. 3 is a system diagram schematically showing the configuration of a fuel cell system 20 that includes a fuel cell stack 22 and is mounted on the fuel cell vehicle 10 of the first embodiment.

FIG. 1 is a plan view showing a plane layout of devices mounted on a fuel cell vehicle 10 in a first embodiment of the invention. FIG. 2 is a side view showing a side layout of the devices mounted on the fuel cell vehicle 10 of the first embodiment. FIG. 3 is a system diagram schematically showing the configuration of a fuel cell system 20 that includes a fuel cell stack 22 and is mounted on the fuel cell vehicle 10 of the first embodiment. For simplicity of explanation, the description first regards the configuration of the fuel cell system 20 with reference to the system diagram of FIG. 3 and then the layout of the respective devices included in the fuel cell system 20 with reference to FIGS. 1 and 2.

The fuel cell system 20 mounted on the fuel cell vehicle 10 of the first embodiment includes a fuel cell stack 22 or a stack of multiple layers of unit cells, each of which has two electrodes (a fuel electrode and an air electrode) arranged across a polymer electrolyte membrane. The fuel cell system 20 also includes a hydrogen supply system 30 that feeds a supply of hydrogen from a high-pressure hydrogen tank 31 to the fuel electrodes (anodes) of the fuel cell stack 22, an air supply discharge system 40 that feeds a supply of the air to the air electrodes (cathodes) of the fuel cell stack 22 and processes the cathode exhaust from the air electrodes, a cooling system 50 that cools down the fuel cell stack 22, and a release system 60 that releases exhaust gas and water produced in the fuel cell system to the atmosphere.

The hydrogen supply system 30 includes a hydrogen supply conduit 32 that leads a supply of hydrogen from the high-pressure hydrogen tank 31 into a hydrogen supply path to the anodes, which is formed inside the fuel cell stack 22, and a hydrogen circulation conduit 33 that returns a flow of unreacted hydrogen through a hydrogen exhaust path from the anodes, which is formed inside the fuel cell stack 22, to the hydrogen supply conduit 32. The hydrogen supply conduit 32 has a check valve that prevents a reverse flow of hydrogen to the high-pressure hydrogen tank 31 and a gate valve that works to start or stop supply of hydrogen to the fuel cell stack 22. The hydrogen circulation conduit 33 has a hydrogen pump 34 that pressure feeds hydrogen to the hydrogen supply conduit 32, a gas-liquid separator 38 that liquefies steam contained in the circulated hydrogen for gas-liquid separation, a check valve that prevents a reverse flow of hydrogen to the hydrogen supply conduit 32, and a gate valve that works to stop discharge of exhaust hydrogen from the fuel cell stack 22. Diversity of sensors are attached to the hydrogen supply conduit 32 and the hydrogen circulation conduit 33 to regulate the supply of hydrogen to the fuel cell stack 22 and the operating conditions of the fuel cell stack 22. Typical examples of such sensors include pressure sensors located in the vicinity of an inlet of the fuel cell stack 22 and on the discharge side of the hydrogen pump 34 and temperature sensors located in the vicinity of an outlet of the fuel cell stack 22 and on the discharge side of the hydrogen pump 34. The water separated by the gas-liquid separator 38 is sent to buffer tanks 62a through 62c in the release system 60. The hydrogen circulation conduit 33 has a branch pipe via the gate valve. Hydrogen in the hydrogen circulation conduit 33 flows through the branch pipe, is introduced into a dilution unit 61 of the release system 60 for dilution, and is released to the atmosphere.

In the air supply discharge system 40, a supply of the air is measured by a mass flow meter 43, is pressurized by an air compressor 44, is humidified by a humidifier 46, and is supplied to the cathodes of the fuel cell stack 22 via an air supply conduit 42. The air (cathode exhaust) from the cathodes of the fuel cell stack 22 is introduced into the humidifier 46 to humidify the air supply from the compressor 44 and runs through a gas-liquid separator 48 for gas-liquid separation. The water separated by the gas-liquid separator 48 is sent to buffer tanks 62a through 62c, while the separated gas (exhaust gas) is sent to the dilution unit 61 to be used as a diluting gas and is finally released to the atmosphere. The gas-liquid separator 48 used in this embodiment does not attain complete gas-liquid separation but only imperfectly separates the gas from water. Namely the gas separated by the gas-liquid separator 48 is not completely dried but may contain imperfectly saturated, perfectly saturated, or oversaturated steam or contain small droplets of water in addition to such steam.

The cooling system 50 circulates a flow of cooling water through a cooling water circulation conduit 52, which includes a cooling water flow path formed inside the fuel cell stack 22, to cool the fuel cell stack 22 down. The cooling water circulation conduit 52 has a cooling water pump 54 to circulate the flow of cooling water and a radiator 56 with a fan to cool down the circulated cooling water with the flow of the outside air. For the purpose of temperature control of the cooling water, temperature sensors to measure the temperature of cooling water are located in the vicinity of an outlet of the fuel cell stack 22 and in the downstream of the radiator 56 in the cooling water circulation conduit 52.

The release system 60 includes a water release system and a gas release system. In the water release system, the water separated by the gas-liquid separator 38 in the hydrogen supply system 30 and the water separated by the gas-liquid separator 48 in the air supply discharge system 40 is temporarily accumulated in the buffer tanks 62a through 62c and is released from multiple water outlets (two water outlets in the structure of the first embodiment) 64b and 64c. In the gas release system, the gas exhaust separated by the gas-liquid separator 48 in the air supply discharge system 40 is sent to the dilution unit 61 to be used as the diluting gas and dilute the exhaust of hydrogen discharged from the hydrogen supply system 30 and is eventually released to the atmosphere.

In the fuel cell system 20 having the above configuration, the fuel cell stack 22 is controlled through actuation of the hydrogen pump 34, the air compressor 44, and the cooling water pump 54 and regulation of the openings of the gate valves and flow control valves in response to signals sent from the diverse sensors. The fuel cell system 20 also includes a power control unit (hereafter referred to as PCU) 70 to control a non-illustrated drive motor, a chargeable and dischargeable battery 84, and an inverter for driving the motor. These elements are, however, not essential of the invention, so that illustration and detailed description of these elements are omitted.

As shown in FIGS. 1 and 2, the fuel cell stack 22 is laid in the lower central area on the front side of the vehicle and the PCU 70 is located above the fuel cell stack 22. The humidifier 46 and the air compressor 44 are located in a fender on the left front of the fuel cell stack 22, whereas the buffer tank 62a is located in a fender on the right front of the fuel cell stack 22. A radiator 56 is located in front of the fuel cell stack 22, and another radiator 72 for air conditioning in the passenger compartment is further located in front of the radiator 56. The buffer tanks 62b and 62c are set in the lower left and right corners inside a front bumper. The gas-liquid separator 48 in the air supply discharge system 40 is laid on the front lower right side of the driver's seat (the driver's seat on the right-hand drive vehicle). The hydrogen pump 34, the cooling water pump 54, and the gas-liquid separator 38 are also placed in the front portion of the vehicle and the dilution unit 61 is placed on one of the front, center, and the rear portions of the vehicle, although these elements are omitted from the illustration of FIGS. 1 and 2.

The buffer tank 62a is linked to the gas-liquid separator 38 in the hydrogen supply system 30 and to the gas-liquid separator 48 in the air supply discharge system 40 via non-illustrated connecting pipes, while being connected with the buffer tanks 62b and 62c set in the lower left and right corners inside the front bumper via non-illustrated water pipes. The water separated by the gas-liquid separators 38 and 48 is temporarily accumulated in the buffer tank 62a located inside the fender and is then sent to the left and right buffer tanks 62b and 62c located inside the bumper. The buffer tank 62a has an air-bleeding hole to reduce the pressure in the buffer tanks 62a through 62c. The buffer tanks 62b and 62c located inside the bumper are connected via non-illustrated water discharge pipes to the two water outlets 64b and 64c of an identical shape attached to the front inner faces of the fenders for the left and right front wheels. The water accumulated in the buffer tanks 62b and 62c is accordingly released from the water outlets 64b and 64c. The water outlets 64b and 64c have drainable cross sections designed to make the release quantity of water per unit time less than the quantity of water per unit time produced through power generation of the fuel cell stack 22 under application of maximum loading to the fuel cell stack 22. In the fuel cell vehicle 10 of the first embodiment, the drainage cross sections of the water outlets 64b and 64c are designed to release the mean quantity of water per unit time produced in the fuel cell stack 22 during a run in a standard drive pattern or a little greater quantity of water from the water outlets 64b and 64c.

In the fuel cell vehicle 10 of the first embodiment constructed as discussed above, the water produced in the fuel cell stack 22, that is, the water separated by the gas-liquid separator 38 in the hydrogen supply system 30 and the water separated by the gas-liquid separator 48 in the air supply discharge system 40, is temporarily kept in the buffer tank 62a inside the right fender, is accumulated in the buffer tanks 62b and 62c located in the lower left and right corners inside the bumper, and is released from the water outlets 64b and 64c attached to the front inner faces of the fenders for the front wheels. The water produced in the fuel cell stack 22 is released after accumulation in the buffer tanks 62a, 62b, and 62c. This arrangement desirably reduces the release quantity of water, compared with the structure that immediately releases the water produced in the fuel cell stack 22 under application of large loading. The reduced flow of released water leads to the reduced amount of water scattered by and swirled on the vehicle wind. The water outlets 64b and 64c are laid in the front corners of the fender for the front wheels. This structure effectively restricts the released water from being scattered by and swirled on the vehicle wind, compared with the structure with the water outlets 64b and 64c located in rear corners of the fender for the front wheels or located in a fender for rear wheels. The water outlets 64b and 64c are laid inside the fender having little potential effects of the vehicle wind. This layout effectively restricts the released water from being scattered by and swirled on the vehicle wind and thereby prevents potential troubles such that the released water is scattered on other vehicles running on the side and behind.

In the fuel cell vehicle 10 of the first embodiment, the water produced in the fuel cell stack 22 is temporarily kept in the buffer tank 62a inside the right fender, is accumulated in the buffer tanks 62b and 62c located in the lower left and right corners inside the bumper, and is released from the water outlets 64b and 64c attached to the front inner faces of the fenders for the front wheels. The buffer tanks 62b and 62c in the lower left and right corners inside the bumper may be omitted from the structure. In this modified structure, the water produced in the fuel cell stack 22 is accumulated in the buffer tank 62a located inside the right fender and is released from the water outlets 64b and 64c. The buffer tank 62a inside the right fender may alternatively be omitted from the structure. In this modified structure, the water produced in the fuel cell stack 22 is accumulated in the buffer tanks 62b and 62c located in the lower left and right corners inside the bumper and is released from the water outlets 64b and 64c. The buffer tank 62a inside the right fender and the buffer tanks 62b and 62c in the lower left and right corners inside the bumper may all be omitted from the structure. In this modified structure, the water produced in the fuel cell stack 22 is directly released from the water outlets 64*b* and 64*c*. This modified structure can not make a substantially fixed release flow per unit time, but still exerts the essential effects of release of water forward the fender for the front wheels.

In the fuel cell vehicle 10 of the first embodiment, the water produced in the fuel cell stack 22 is released from the two left and right water outlets 64*b* and 64*c* attached to the front inner faces of the fender for the front wheels. There may be three or more water outlets for release of water, or one of the water outlets 64*b* and 64*c* may be omitted. The water outlets 64*b* and 64*c* may have different shapes, instead of the identical shape in the fuel cell vehicle 10 of the first embodiment. For example, the shapes of the water outlets 64*b* and 64*c* may be designed to make the release quantity of water per unit time from the water outlet 64*b* greater than the release quantity of water per unit time from the water outlet 64*c*.

In the fuel cell vehicle 10 of the first embodiment, unreacted hydrogen discharged from the fuel cell stack 22 is circulated through the hydrogen circulation conduit 33 to the hydrogen supply conduit 32. The hydrogen circulation conduit 33 may, however, be omitted from the structure.

In the fuel cell vehicle 10 of the first embodiment, the gas-liquid separator 48 in the air supply discharge system 40 does not have the function of complete gas-liquid separation. The gas-liquid separator may, however, have the complete gas-liquid separating function.

B. Second Embodiment

Figure 4:
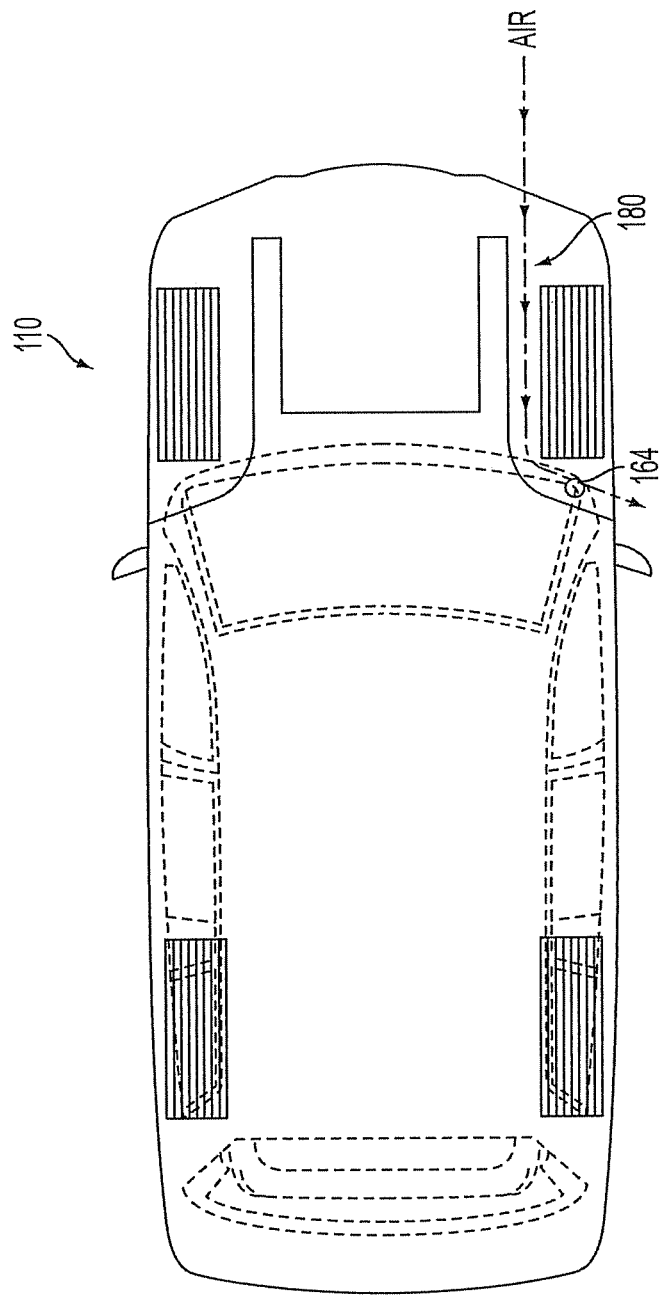
FIG. 4 is a plan view showing a plane layout of a water outlet 164 and an air flow-guiding path 180 in the fuel cell vehicle 110 in a second embodiment.
Figure 5:
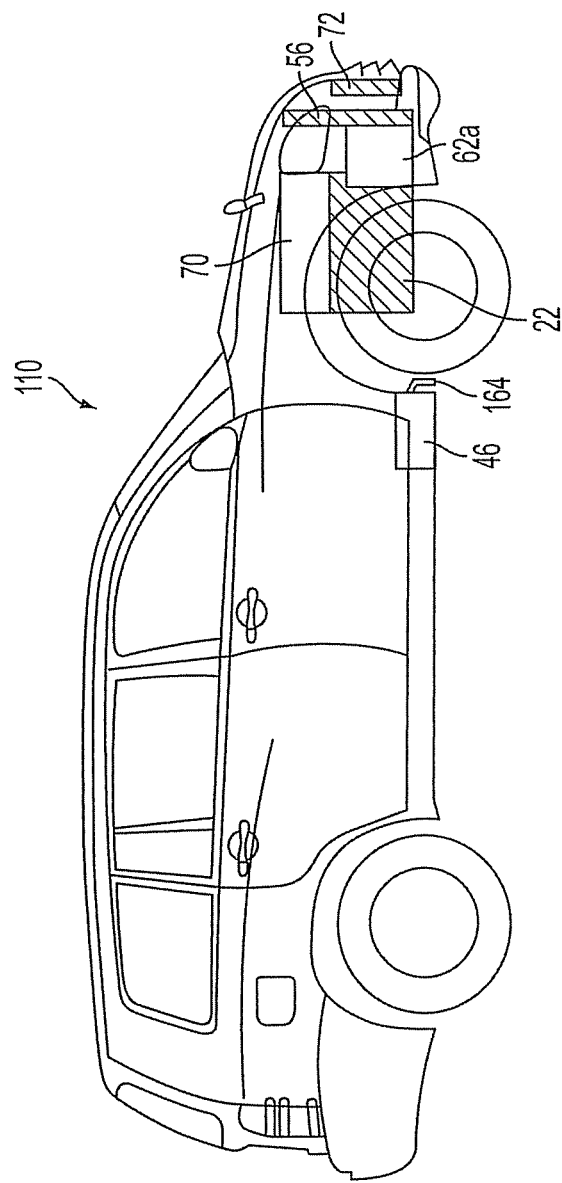
FIG. 5 is a side view showing a side layout of devices mounted on the fuel cell vehicle 110 of the second embodiment.

A fuel cell vehicle 110 in a second embodiment of the invention is discussed below. FIG. 4 is a plan view showing a plane layout of a water outlet 164 in the fuel cell vehicle 110 of the second embodiment. FIG. 5 is a side view showing a side layout of devices mounted on the fuel cell vehicle 110 of the second embodiment. The fuel cell vehicle 110 of the second embodiment has similar structure to that of the fuel cell vehicle 10 of the first embodiment, except exclusion of the buffer tanks 62*b* and 62*c*, layout of the water outlet 164 for releasing the water accumulated in the buffer tank 62*a*, and addition of an air flow-guiding path 180 to guide the air flow to the vicinity of the water outlet 164. In order to avoid duplicated explanation, the like constituents of the fuel cell vehicle 110 of the second embodiment to those of the fuel cell vehicle 10 of the first embodiment are expressed by the like numerals and are omitted from the illustration and the detailed description.

In the fuel cell vehicle 110 of the second embodiment, the buffer tank 62*a* is connected via a non-illustrated pipe to the water outlet 164, which is formed in the rear inner face of a fender for a front wheel on the side of the driver's seat (on the right side in the right-hand drive vehicle) to release water downward in the vertical direction. The water accumulated in the buffer tank 62*a* is accordingly released from the water outlet 164. In the fuel cell vehicle 110 of the second embodiment, the air flow-guiding path 180 is defined by the front fender and the other parts of the vehicle as the air passage to introduce the air flow from the front and discharge the air flow obliquely backward through the rear side of the front wheel. The air flow-guiding path 180 is designed to release the air at an angle of approximately 45 degrees diagonally backward the vehicle in the vicinity of the water outlet 164 in the fender.

Water is released from the water outlet 164 in the following manner in the fuel cell vehicle 110 of the second embodiment constructed as discussed above. The water released from the water outlet 164 during a run of the vehicle is carried on the air flow led through the air flow-guiding path 180 and is blown obliquely backward the vehicle. The arrangement of making the water from the water outlet 164 flow obliquely backward the vehicle effectively prevents the released water from being swirled on the vehicle wind caused by a run of the vehicle. The rear portion of the vehicle across its width, especially the rear center portion of the vehicle, has the greater potential effects of the vehicle wind. The potential effects of the vehicle wind are reduced on the lateral side of the vehicle with an increase in distance from the vehicle. Release of water obliquely backward the vehicle thus effectively reduces the potential effects of the vehicle wind and prevents the released water from being swirled on the vehicle wind. In the structure of the second embodiment, the flow rate of the air in the air flow-guiding path 180 in the vicinity of the water outlet 164 and the angle of the obliquely backward outflow from the air flow-guiding path 180 are adjusted to make the water released from the water outlet 164 during a run of the vehicle reach the road surface apart a less distance (for example, approximately 50 cm when the vehicle runs at a speed of 60 km/h) from the vehicle than a standard distance to another vehicle or any other obstacle on either side of the vehicle on the road. Such adjustment effectively prevents the water released from the water outlet 164 during a run of the vehicle from splashing about on any other vehicle or obstacle on the road. In the structure of the second embodiment, the water outlet 164 is located on the side of the driver's seat (generally the side closer to the opposing vehicles and closer to the center of the road). The water released from the water outlet 164 during a run of the vehicle thus does not splash about on any pedestrian walking on the road shoulder or on any building or construction facing the road. In the structure of the second embodiment, the water outlet 164 is arranged to release the water downward in the vertical direction, so that the downward force acts on the released water to make the water reach the road surface promptly, compared with the free fall of water. This arrangement effectively prevents the released water from being swirled or scattered by any disturbance like the vehicle wind before reaching the road surface. The water outlet 164 is designed to discharge water vertically downward within the contour of the vehicle when the vehicle is at a stop. This desirably prevents the released water from splashing about on any pedestrian or any construction near to the vehicle.

As described above, in the fuel cell vehicle 110 of the second embodiment, the water outlet 164 is formed in the rear inner face of the fender for the front wheel on the side of the driver's seat to release water downward in the vertical direction. The air flow-guiding path 180 is designed to guide the air flow from the front of the vehicle and discharge the air flow at the angle of approximately 45 degrees diagonally backward the vehicle in the vicinity of the water outlet 164. This arrangement causes the water released from the water outlet 164 to flow obliquely backward the vehicle during a run of the vehicle and thereby effectively restrains the released water from being swirled on the vehicle wind. The arrangement of this embodiment prevents potential troubles such that the released water is scattered on other vehicles running on the side and behind. The water outlet 164 is located on the side of the driver's seat. Such layout desirably prevents the water released from the water outlet 164 during a run of the vehicle from splashing about on any pedestrian walking on the road shoulder or on any building or construction facing the road. The water outlet 164 is designed to release the water vertically downward. This design enables the released water to reach the road surface promptly. The water outlet 164 is designed to discharge water vertically downward within the contour of the vehicle when the vehicle is at a stop. This arrangement effectively restrains the water released from the water outlet 164 at a stop of the vehicle from splashing about on any pedestrian or any construction near to the vehicle.

Figure 6:
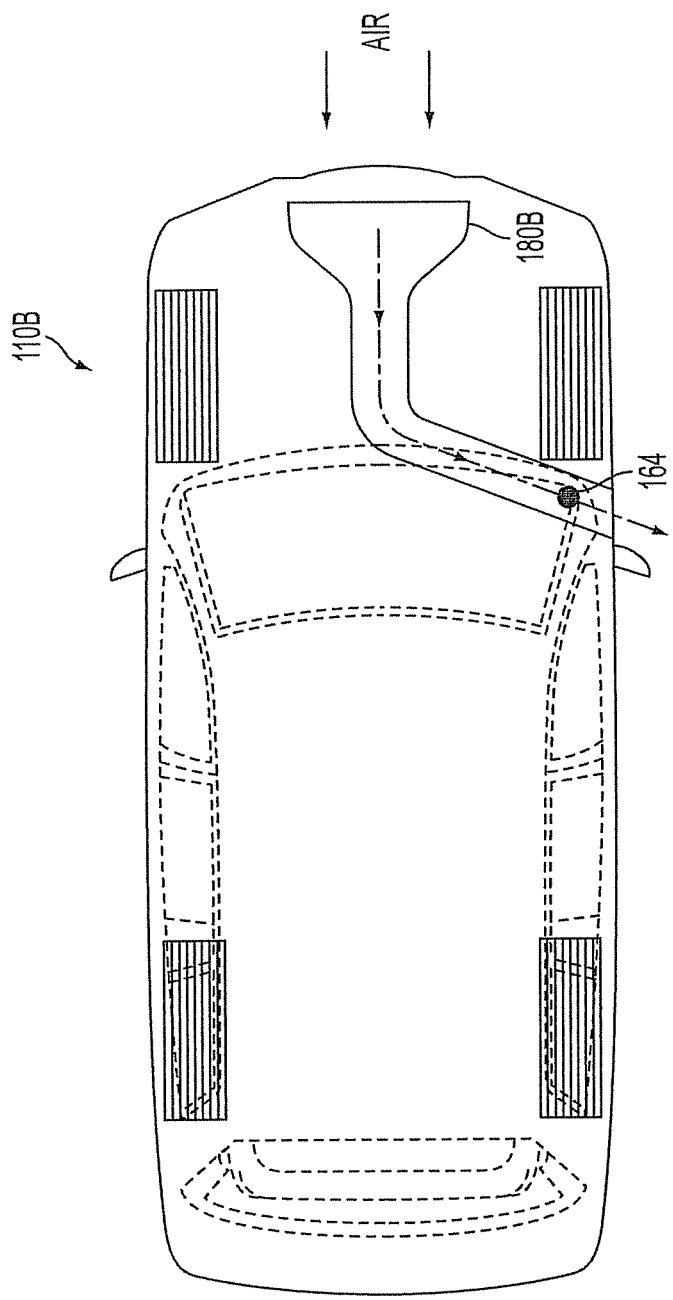
FIG. 6 is a plan view showing a plane layout of a water outlet 164 and an air duct 180B in the fuel cell vehicle 110B in a modified structure of a second embodiment.
Figure 7:
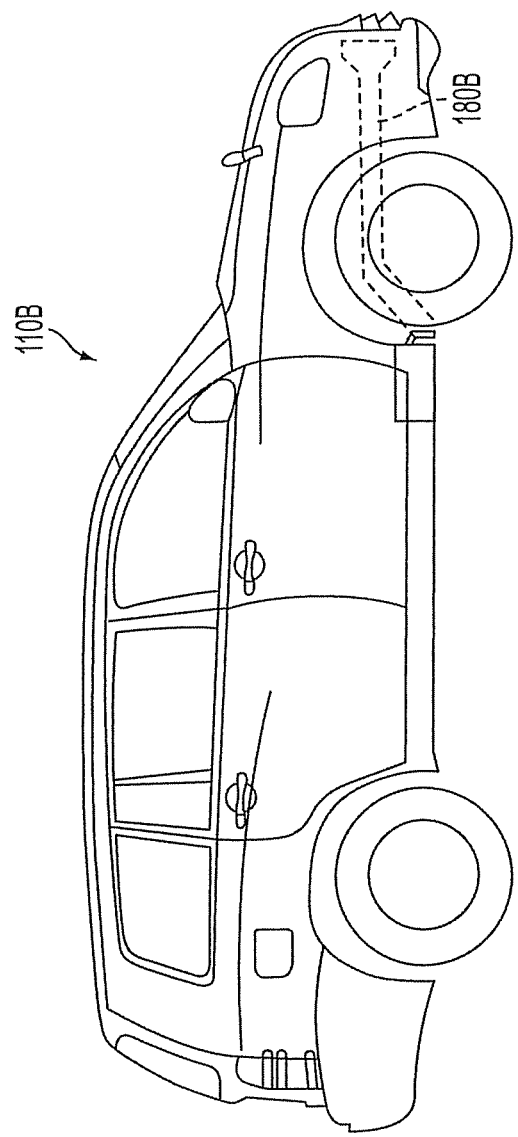
FIG. 7 is a side view showing a side layout of the water outlet 164 and the air duct 180B.

In the fuel cell vehicle 110 of the second embodiment, the air flow-guiding path 180 is designed to discharge the air flow introduced from the front of the vehicle at the angle of approximately 45 degrees diagonally backward the vehicle behind the front wheel. The requirement is to discharge the guided air flow at the angle of approximately 45 degrees diagonally backward the vehicle in the vicinity of the water outlet 164. There may be another air flow-guiding member, in addition to or in place of the air flow-guiding path 180. As shown in the plan view of FIG. 6 and the side view of FIG. 7, a fuel cell vehicle 110B of a modified example has an air duct 180B that is arranged to discharge the air flow introduced from the front of the vehicle at the angle of approximately 45 degrees diagonally backward the vehicle in the vicinity of the water outlet 164. As shown in FIG. 7, the air duct 180B is bent downward, so that the air flow discharged at the angle of approximately 45 degrees diagonally backward the vehicle has the vertically downward speed component. The air flow having the vertically downward component makes the released water reach the road surface within a shorter time period, compared with the water without the air flow. This arrangement thus effectively prevents the released water from being swirled on the vehicle wind before reaching the road surface.

The fuel cell vehicle 110 of the second embodiment discharges the guided air flow at the angle of approximately 45 degrees diagonally backward the vehicle in the vicinity of the water outlet 164. The requirement is to discharge the air flow obliquely backward the vehicle. The discharge angle of the air flow is thus not restricted to 45 degrees but may be any other suitable angle, for example, in the range of about 15 to 75 degrees and particularly in the range of about 30 to 60 degrees.

In the fuel cell vehicle 110 of the second embodiment, the water outlet 164 is formed in the rear inner face of the fender for the front wheel on the side of the driver's seat. The water outlet may be formed at any other suitable position, for example, in the front inner face of the fender for the front wheel on the side of the driver's seat, in the front or rear inner face of the fender for the rear wheel on the side of the driver's seat, in the front or rear inner face of the fender for the front wheel on the side of the front passenger's seat, or in the front or rear inner face of the fender for the rear wheel on the side of the front passenger's seat. The water outlet may be formed at a location other than the fender.

C. Third Embodiment

Figure 8:
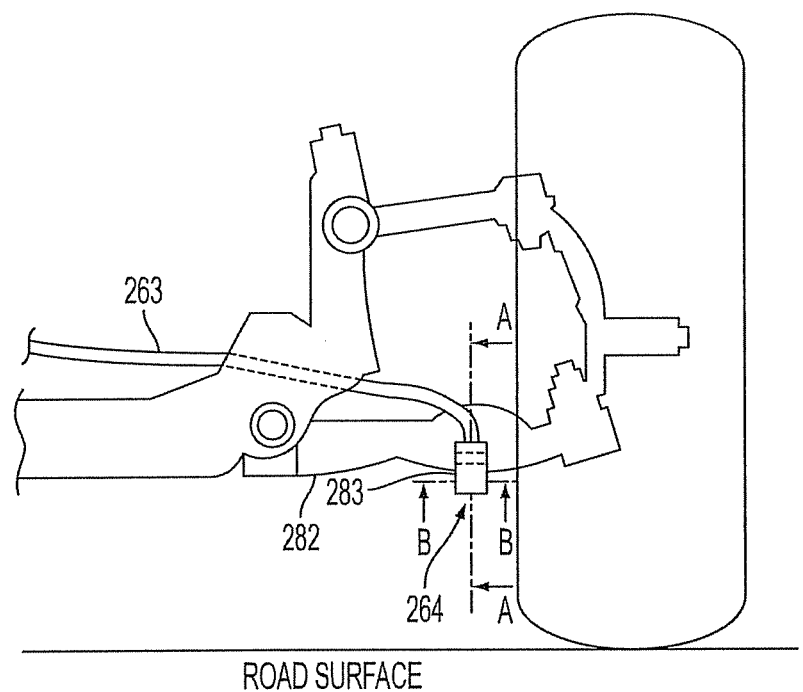
FIG. 8 shows a layout of a water outlet 264 in a fuel cell vehicle 210 of a third embodiment.

A fuel cell vehicle 210 in a third embodiment of the invention is discussed below. FIG. 8 shows the layout of a water outlet 264 in the fuel cell vehicle 210 of the third embodiment. The fuel cell vehicle 210 of the third embodiment has similar structure to that of the fuel cell vehicle 10 of the first embodiment, except exclusion of the buffer tanks 62b and 62c and layout of the water outlet 264 for releasing the water accumulated in the buffer tank 62a. In order to avoid duplicated explanation, the like constituents of the fuel cell vehicle 210 of the third embodiment to those of the fuel cell vehicle 10 of the first embodiment are expressed by the like numerals and are omitted from the illustration and the detailed description.

Figure 9:
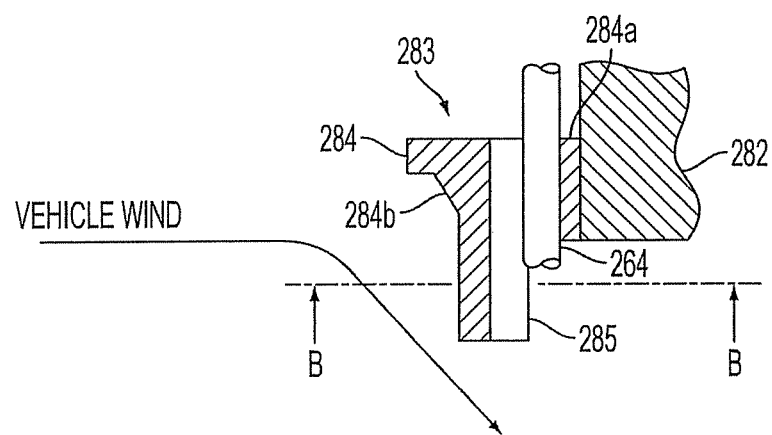
FIG. 9 is an enlarged sectional view, taken on a line A-A of FIG. 8.
Figure 10:
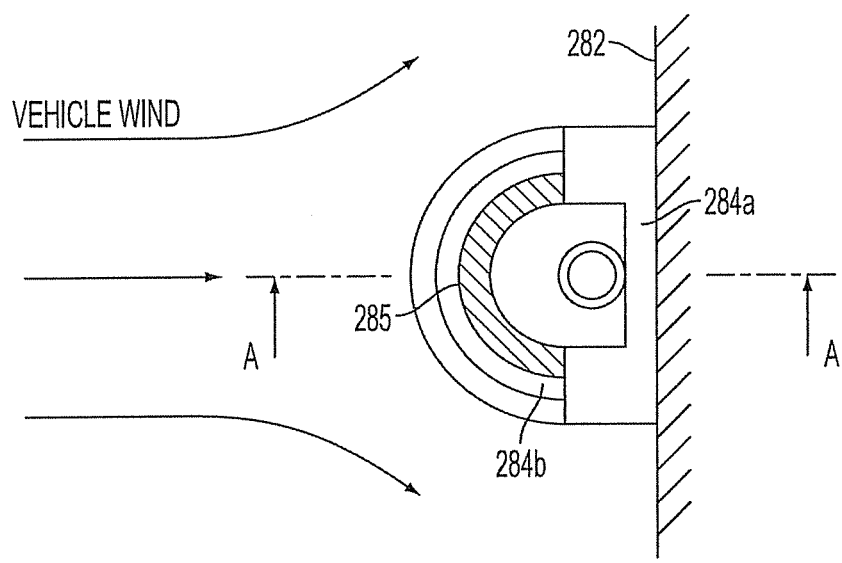
FIG. 10 is an enlarged sectional view, taken on a line B-B of FIG. 8.

In the fuel cell vehicle 210 of the third embodiment, the water outlet 264 connected to the buffer tank 62a by a conduit pipe 263 is attached to a lower arm 282 by means of an air dam 283. The lower arm 282 works as an under-spring member of a suspension device for the front wheel on the side of the driver's seat. FIG. 9 is an enlarged sectional view, taken on a line A-A of FIG. 8, and FIG. 10 is an enlarged sectional view, taken on a line B-B of FIG. 8. As illustrated, the air dam 283 has an arch-shaped member 284 extended to the joint with the lower arm 282 and a lower semicircular member 285. The arch-shaped member 284 has a quasi semicircular cross section and an extended joint portion 284a. The water outlet 264 is located in the extended joint portion 284a of the arch-shaped member 284. The extended joint portion 284a of the arch-shaped member 284 is attached to the lower arm 282. The arch-shaped member 284 also has a chamfered portion 284b formed on the front side of the vehicle (on the left side in the illustration of FIG. 9) to change the direction of the wind from the front of the vehicle (vehicle wind) to obliquely downward. The lower semicircular member 285 of the air dam 283 is arranged in front of the water outlet 264 to prevent the wind from the front of the vehicle (vehicle wind) from directly hitting against the water immediately after the release from the water outlet 264.

Water is released from the water outlet 264 in the following manner in the fuel cell vehicle 210 of the third embodiment constructed as discussed above. The water released from the water outlet 264 during a run of the vehicle is surrounded by the semicircular member 285 of the air dam 283 and is thus not affected by the vehicle wind until the released water reaches the lower end of the semicircular member 285. The released water thus falls immediately beneath the vehicle in the vertical direction. The released water falling beyond the lower end of the semicircular member 285 is naturally affected by the vehicle wind. The presence of the chamfered portion 284b of the air dam 283, however, changes the direction of the vehicle wind to have the vertically downward component at the position directly affecting the water immediate after the release from the water outlet 264, as shown in FIG. 9. The vertically downward force accordingly acts on the released water. This accelerates the fall of the released water and makes the released water promptly reach the road surface. The water outlet 264 is attached to the lower arm 282 functioning as the under-spring member of the suspension device, which vertically moves up and down with the wheels on the uneven road surface. This also makes the water released from the water outlet 264 promptly reach the road surface.

As described above, in the fuel cell vehicle 210 of the third embodiment, the attachment of the water outlet 264 to the lower arm 282 working as the under-spring member of the suspension device, which vertically moves up and down with the wheels on the uneven road surface, enables the water released from the water outlet 264 to promptly reach the road surface. This arrangement desirably prevents the water released from the vehicle from being swirled on the vehicle wind before reaching the road surface. The structure of the air dam 283 effectively restrains the direct effects of the vehicle wind on the water immediately after the release from the water outlet 264, thus making the released water promptly reach the road surface. The air dam 283 is designed, such that the released water falling beyond the lower end of the semicircular member 285 of the air dam 283 is affected by the direction-changed vehicle wind having the vertically downward component. This structure desirably shortens the time required for the fall of water to the road surface and thus prevents the water released from the vehicle from being swirled on the vehicle wind before reaching the road surface. The arrangement of this embodiment prevents potential troubles such that the released water is scattered on other vehicles running on the side and behind.

The fuel cell vehicle 210 of the third embodiment has the chamfered portion 284b that changes the direction of the vehicle wind to have the vertically downward direction at the position directly affecting the water immediately after the release from the water outlet 264. One possible modification may not form the chamfered portion 284b and may thus not change the direction of the vehicle wind to have the vertically downward component at the position directly affecting the water immediately after the release from the water outlet 264.

The fuel cell vehicle 210 of the third embodiment has the air dam 283 to protect the water immediately after the release from the water outlet 264 from the potential effects of the vehicle wind. The air dam 283 may, however, be omitted if not necessary.

In the fuel cell vehicle 210 of the third embodiment, the water outlet 264 is attached to the lower arm 282 that works as the under-spring member of the suspension device for the front wheel on the side of the driver's seat. The water outlet 264 may alternatively be attached to a lower arm working as the under-spring member of a suspension device for the rear wheel on the side of the driver's seat or to a lower arm working as the under-spring member of a suspension device for the front wheel or the rear wheel on the front passenger's seat. There may be multiple water outlets 264 respectively attached to the lower arm 282 as the under-spring member of the suspension device for the front wheel on the side of the driver's seat and to the lower arm as the under-spring member of the suspension device for the front wheel on the side of the front passenger's seat.

D. Fourth Embodiment

Figure 11:
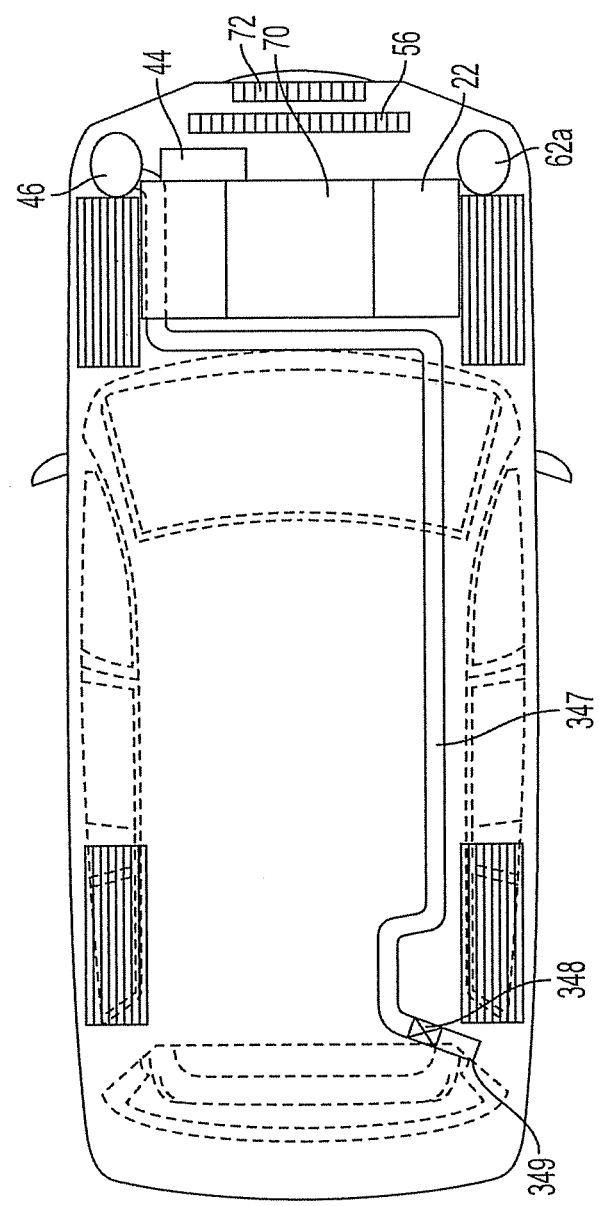
FIG. 11 is a plan view showing a plane layout of devices mounted on a fuel cell vehicle 310 in a fourth embodiment.
Figure 12:
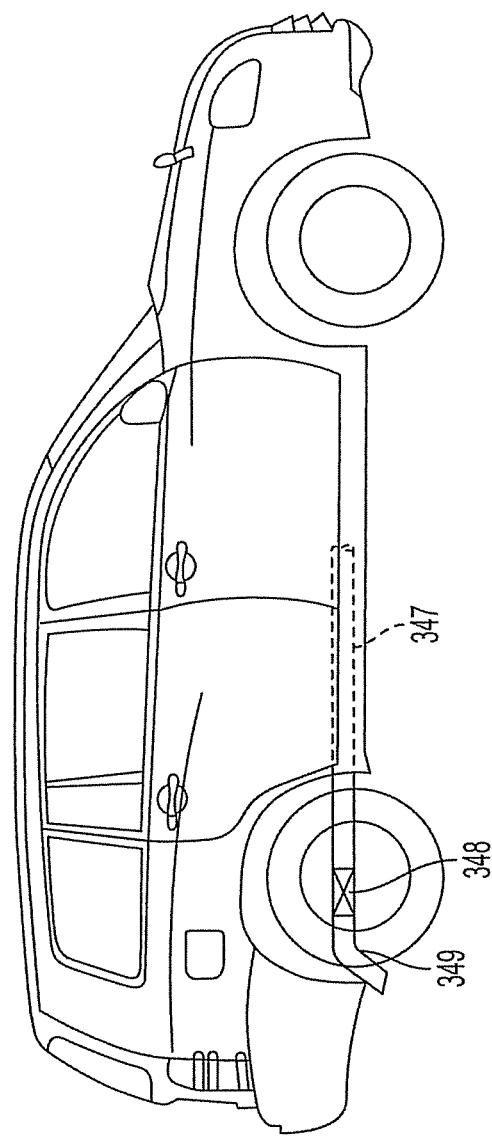
FIG. 12 is a side view showing the location of an exhaust conduit 347 and a gas-liquid separator 348 in the fuel cell vehicle 310 of the fourth embodiment.
Figure 13:
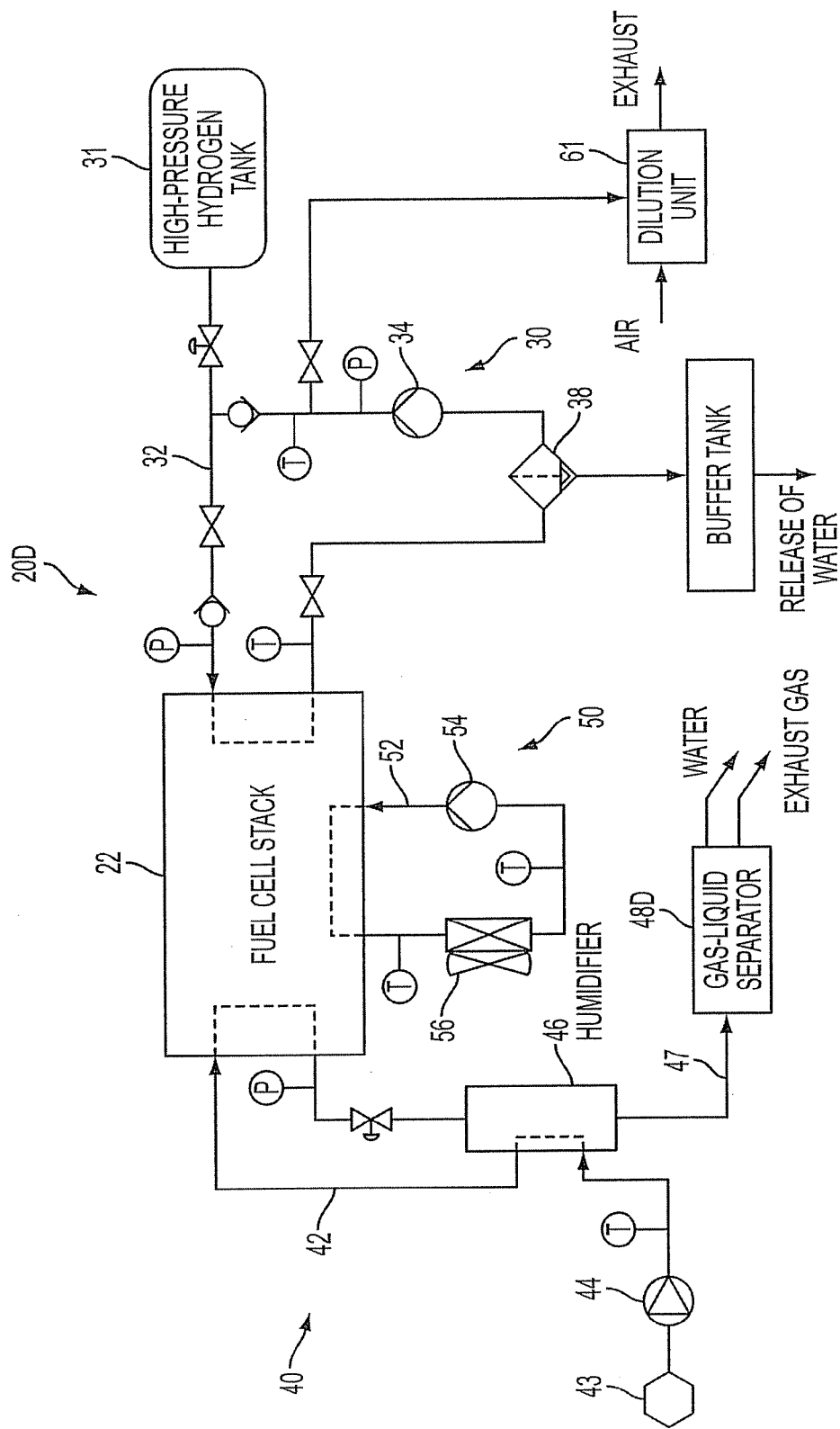
FIG. 13 is a system diagram schematically showing the configuration of a fuel cell system 320 that includes the fuel cell stack 22 and is mounted on the fuel cell vehicle 310 of the fourth embodiment.

A fuel cell vehicle 310 in a fourth embodiment of the invention is discussed below. FIG. 11 is a plan view showing a plane layout of devices mounted on the fuel cell vehicle 310 of the fourth embodiment. FIG. 12 is a side view showing the location of a gas-liquid separator 348 in the fuel cell vehicle 310 of the fourth embodiment. FIG. 13 is a system diagram schematically showing the configuration of a fuel cell system 320 that includes the fuel cell stack 22 and is mounted on the fuel cell vehicle 310 of the fourth embodiment. As shown in FIG. 13, the fuel cell system 320 mounted on the fuel cell vehicle 310 of the fourth embodiment has similar configuration to that of the fuel cell system 20 mounted on the fuel cell vehicle 10 of the first embodiment, except the different exhaust process adopted in the air supply discharge system 40 and the intake of the air for dilution to the dilution unit 61. In order to avoid duplicated explanation, the like constituents of the fuel cell system 320 mounted on the fuel cell vehicle 310 of the fourth embodiment to those of the fuel cell system 20 mounted on the fuel cell vehicle 10 of the first embodiment are expressed by the like numerals and are omitted from the detailed description. The like constituents of the fuel cell vehicle 310 of the fourth embodiment other than the fuel cell system 320 to those of the fuel cell vehicle 10 of the first embodiment are also expressed by the like numerals.

In the fuel cell system 320 mounted on the fuel cell vehicle 310 of the fourth embodiment, the exhaust gas containing water, which is produced through the power generation in the fuel cell stack 22, in the form of steam is introduced to the humidifier 46 to humidify the air that is pressurized by the air compressor 44 and is fed to the fuel cell stack 22 via the air supply conduit 42, as shown in FIG. 13. The steam-containing exhaust gas then flows through an exhaust conduit 347 to the gas-liquid separator 348 located in the vicinity of the rear wheel on the side of the driver's seat as shown in FIGS. 11 and 12. The steam-containing exhaust gas goes through gas liquid separation in the gas-liquid separator 348 and is released to the atmosphere via a bent discharge pipe 349.

Figure 14:
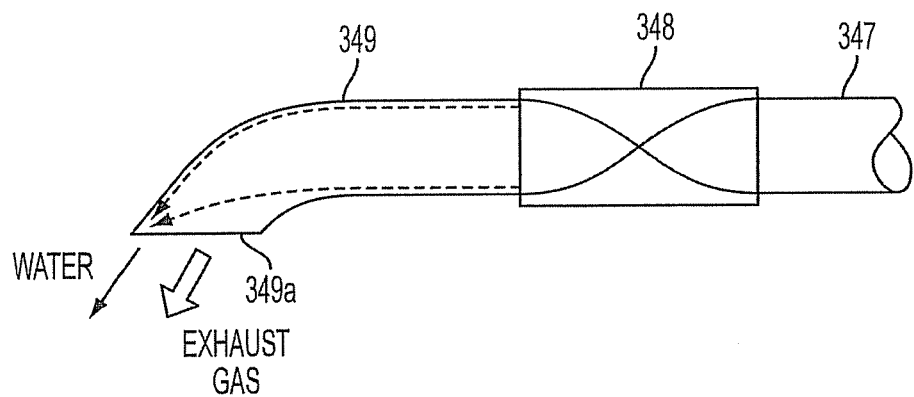
FIG. 14 shows the structure of an air supply discharge system 40 in the fuel cell vehicle 310 of the fourth embodiment.

FIG. 14 shows the structure of the gas-liquid separator 348 and the bent discharge pipe 349. The gas-liquid separator 348 is designed in a ribbon shape and has a twisted inner member to spirally swirl the exhaust gas flowing through the exhaust conduit 347. The spiral revolution of the exhaust gas causes the centrifugal force to act on the water droplets contained in the exhaust gas. The centrifugal force accumulates the water droplets on the wall surface of the gas-liquid separator 348 to effect the gas liquid separation. The gas separated by the gas-liquid separator 348 accordingly contains steam and very small liquid water droplets. The bent discharge pipe 349 is linearly extended from the joint with the gas-liquid separator 348 and is then bent downward in the vertical direction. The free end of the bent discharge pipe 349 is cut substantially parallel to the road surface to form an exhaust outlet 349a. The exhaust outlet 349a of the bent discharge pipe 349 is located behind the rear wheel on the side of the driver's seat as shown in FIGS. 11 and 12 to reduce the potential effects of the vehicle wind on the water released from the exhaust outlet 349a.

Figure 15:
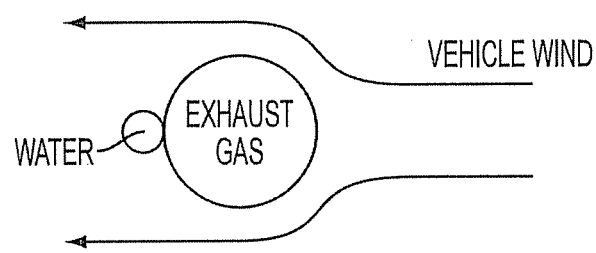
FIG. 15 shows vehicle wind relative to released water and exhaust gas.

Water is released in the following manner from the fuel cell vehicle 310 of the fourth embodiment constructed as discussed above. Water contained in the exhaust gas flowing through the exhaust conduit 347 to the gas-liquid separator 348 is accumulated on the wall surface of the gas-liquid separator 348 by the function of centrifugal separation and moves rearward with the flow of the exhaust gas along the wall surface of the bent discharge pipe 349. The surface tension of water and the flow of the exhaust gas accumulate the water droplets at the backmost end of the exhaust outlet 349a and cause the accumulated water to be released from the backmost end of the exhaust outlet 349a toward the road surface. The gas separated by the gas-liquid separator 348 is discharged from the practically whole area of the exhaust outlet 349a in substantially the same direction as that of the water released from the backmost end of the exhaust outlet 349a. The exhaust outlet 349a is located behind the rear wheel on the side of the driver's seat to reduce the potential effects of the vehicle wind on the released water as mentioned above. But the released water is not completely free from the potential effects of the vehicle wind. FIG. 15 shows the vehicle wind relative to the water and the exhaust gas released from the exhaust outlet 349a. As illustrated, the exhaust gas discharged from the practically whole area of the exhaust outlet 349a works as the air curtain to protect the water released from the backmost end of the exhaust outlet 349a from the vehicle wind. This arrangement effectively prevents the water released from the exhaust outlet 349a from being swirled on the vehicle wind. The air curtain of the exhaust gas restricts the motions of the released water by the vehicle wind.

As described above, the fuel cell vehicle 310 of the fourth embodiment has the gas-liquid separator 348 that utilizes the function of centrifugal separation to effect gas liquid separation, and the bent discharge pipe 349 that is bent downward in the vertical direction and has the exhaust outlet 349a arranged substantially parallel to the road surface. The water separated by the gas-liquid separator 348 is released from the backmost end of the exhaust outlet 349a, whereas the exhaust gas separated by the gas-liquid separator 348 is discharged from the practically whole area of the exhaust outlet 349a. The discharged exhaust gas functions as the air curtain to protect the released water from the vehicle wind and thus effectively restrains the released water from being swirled on the vehicle wind. The exhaust outlet 349a is located behind the rear wheel on the side of the driver's seat having the less potential effects of the vehicle wind. This further effectively prevents the water released from the backmost end of the exhaust outlet 349a from being swirled on the vehicle wind. The arrangement of this embodiment prevents potential troubles such that the released water is scattered on other vehicles running on the side and behind.

The fuel cell vehicle 310 of the fourth embodiment uses the bent discharge pipe 349 that is bent downward in the vertical direction and has the exhaust outlet 349a arranged substantially parallel to the road surface. This bent discharge pipe 349 may be replaced by an extension of the exhaust conduit 347, which is not bent downward in the vertical direction but leads the water and the exhaust gas substantially horizontally from the gas-liquid separator 348 to the rear portion of the rear wheel on the side of the driver's seat and has an exhaust outlet located in the vicinity of a closed end of the extension to be open downward. In this modified structure, the water separated by the gas-liquid separator 348 moves rearward with the flow of the exhaust gas along the wall surface of the extension of the exhaust conduit 347 and is released from the backmost end of the downward exhaust outlet. The closed end of the extension causes the exhaust gas discharged from the exhaust outlet to have the vertically downward component. This modified structure thus exerts the similar effects to those of the fuel cell vehicle 310 of the fourth embodiment. The exhaust outlet may be formed immediately beneath the closed end of the extension or at a position slightly apart from the closed end.

Figure 16:
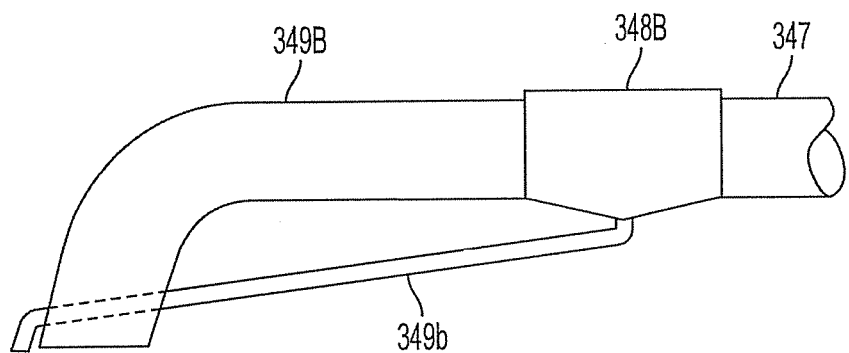
FIG. 16 shows a modified example of the structure of the air supply discharge system 40 of the fourth embodiment.
Figure 17:
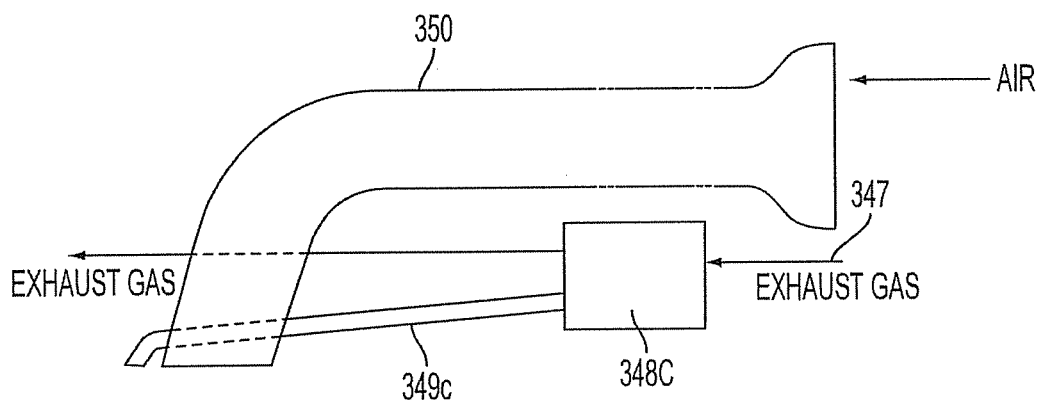
FIG. 17 shows another modified example of the structure of the air supply discharge system 40 of the fourth embodiment.

In the fuel cell vehicle 310 of the fourth embodiment, the bent discharge pipe 349 is designed such that the water separated by the gas-liquid separator 348 is released with the flow of the exhaust gas from the backmost end of the exhaust outlet 349a, while the exhaust gas separated by the gas-liquid separator 348 is discharged from the practically whole area of the exhaust outlet 349a. The requirement is that the exhaust gas is discharged to protect the released water from the vehicle wind as shown in FIG. 15. For example, in a modified structure of FIG. 16, the exhaust gas and the water separated by a gas-liquid separator 348B separately flow through an exhaust gas conduit 349B and through a water release conduit 349b. The exhaust gas conduit 349B and the water release conduit 349b are arranged to locate the outlet of the water release conduit 349b for release of water behind the outlet of the exhaust gas conduit 349B for discharge of the exhaust gas in the moving direction of the vehicle. It is preferable that the direction of the water release is substantially the same as the direction of the discharge of the exhaust gas. The gas flow protecting the released water from the vehicle wind is not restricted to the exhaust gas from the fuel cell stack 22, but the flow of the air may be used to protect the released water from the vehicle wind. For example, as shown in a modified structure of FIG. 17, the air outlet of an air duct 350 that guides the flow of the air from the front of the vehicle is arranged ahead of the outlet of a water release conduit 349c for release of the water separated by a gas-liquid separator 348C.

Figure 18:
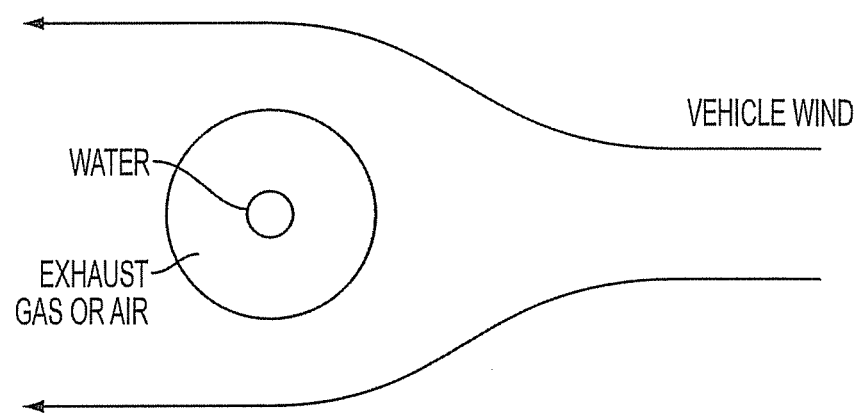
FIG. 18 shows vehicle wind relative to released water and exhaust gas in the modified structures.
Figure 19:
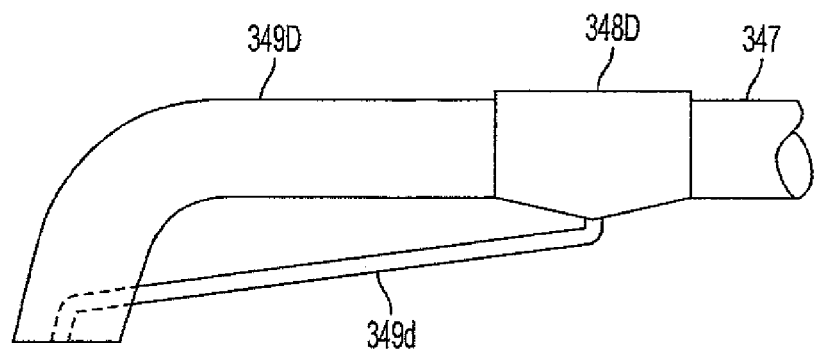
FIG. 19 shows another modified example of the structure of the air supply discharge system 40 of the fourth embodiment.
Figure 20:
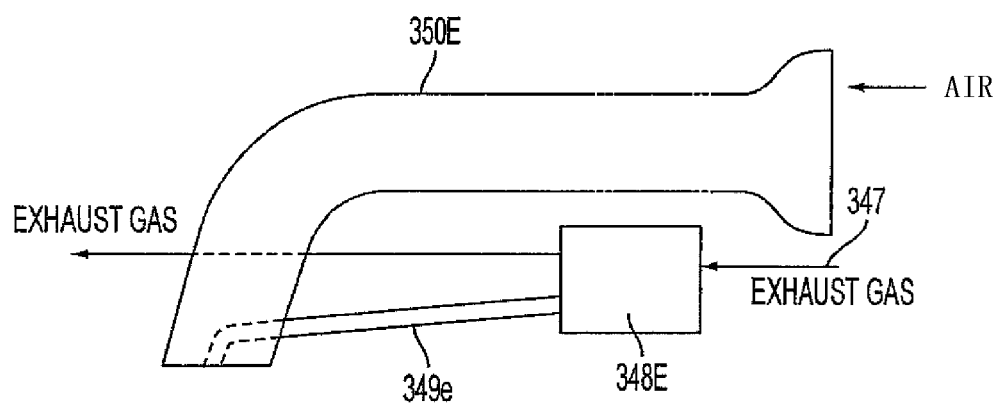
FIG. 20 shows another modified example of the structure of the air supply discharge system 40 of the fourth embodiment.
Figure 21:
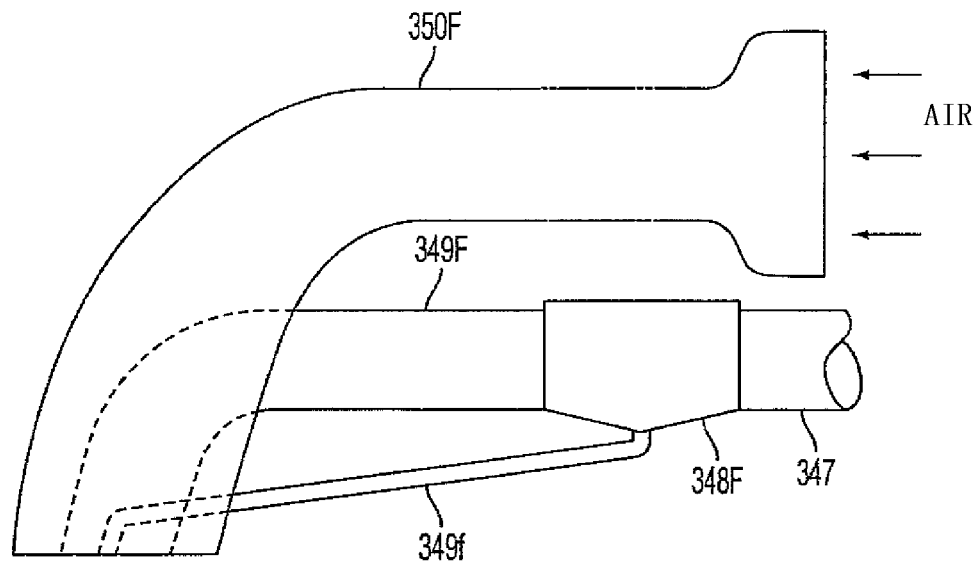
FIG. 21 shows another modified example of the structure of an air supply discharge system 40 of the fourth embodiment.
Figure 22:
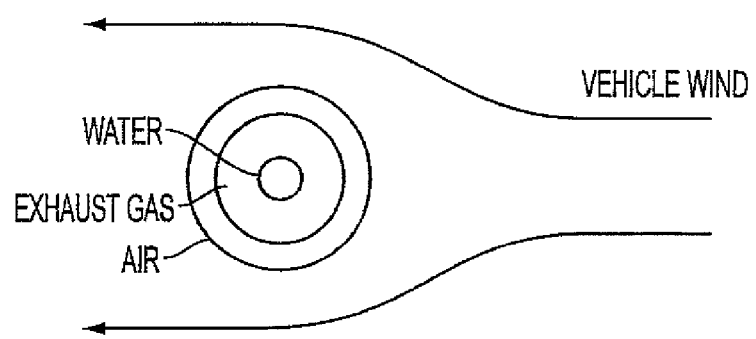
FIG. 22 shows vehicle wind relative to released water and exhaust gas in these modified structures.

The flow of the exhaust gas or the air is used to protect the water, which is separated by the gas-liquid separator 348 and is released from the outlet, from the vehicle wind. As shown in FIG. 18, the exhaust gas or the air may be discharged or led to surround the released water droplets. For example, in a modified structure of FIG. 19, the exhaust gas and the water separated by a gas-liquid separator 348D separately flow through an exhaust gas conduit 349D and through a water release conduit 349d. The exhaust gas conduit 349D and the water release conduit 349d are arranged to locate the outlet of the water release conduit 349d for release of water on the center of the outlet of the exhaust gas conduit 349D for discharge of the exhaust gas. As another example, in a modified structure of FIG. 20, a water release conduit 349e and an air duct 350E are arranged to locate the outlet of the water release conduit 349e for release of the water separated by a gas-liquid separator 348E on the center of the outlet of the air duct 350E for guiding the flow of the air from the front of the vehicle. As still another example, in a modified structure of FIG. 21, a water release conduit 349f, an exhaust gas conduit 349F, and an air duct 350F are arranged to locate the outlet of the water release conduit 349f for release of the water separated by a gas-liquid separator 348F on the center of the outlet of the exhaust gas conduit 349F for discharge of the exhaust gas separated by the gas-liquid separator 348F and to locate the outlet of the exhaust gas conduit 349F on the center of the outlet of the air duct 350F for guiding the flow of the air from the front of the vehicle. In this structure, the water separated by the gas-liquid separator 348F and is released from the outlet is protected from the vehicle wind by the dual air-curtain of the exhaust gas and the air as shown in FIG. 22. This arrangement effectively prevents even the very small liquid water droplets contained in the exhaust gas from being swirled on the vehicle wind.

Figure 23:
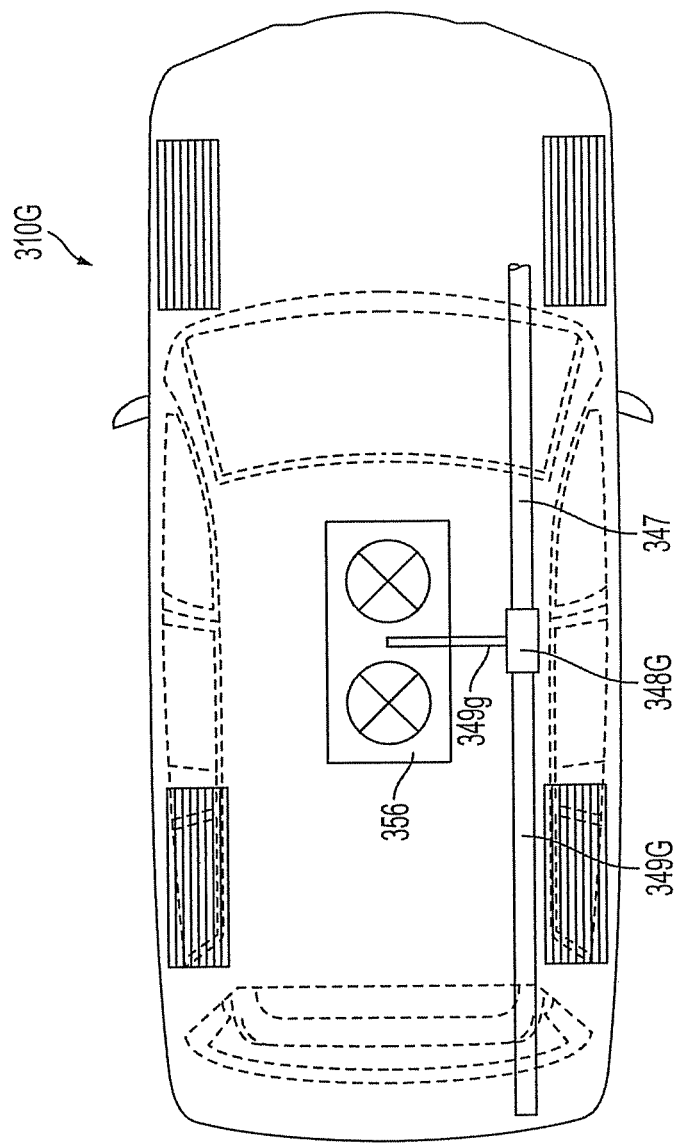
FIG. 23 is a plan view showing a plane layout of the air supply discharge system 40 in one modified structure.
Figure 24:
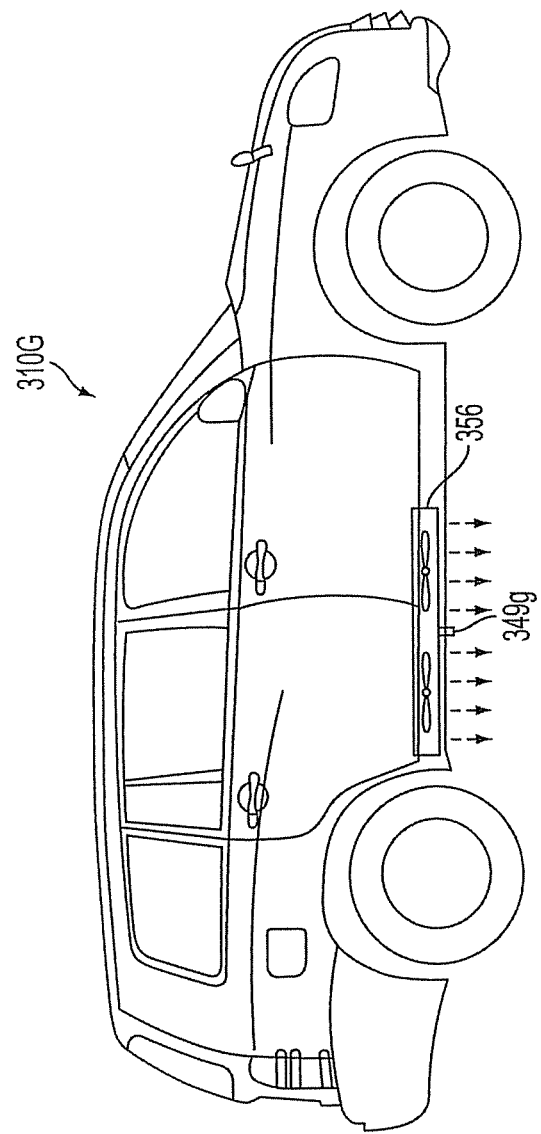
FIG. 24 is a side view showing a side layout of the air supply discharge system 40 in another modified structure.

As mentioned above, the requirement is to protect the water, which is separated by the gas-liquid separator 348 and is released from the outlet, from the vehicle wind. A gas other than the exhaust gas separated by the gas-liquid separator 348 or the air may alternatively be used to protect the released water from the vehicle wind. In a fuel cell vehicle 310G of a modified example shown in FIGS. 23 and 24, a radiator 356 for cooling down the fuel cell stack 22 is located below the floor of the vehicle to make the wind produced by a fan of the radiator 356 face vertically downward. The outlet of a water pipe 349g for release of the water separated by a gas-liquid separator 348G is located on the center of the wind produced by the fan of the radiator 356. The wind produced by the fan of the radiator 356 effectively protects the water, which is separated by the gas-liquid separator 348G and is released from the outlet of the water pipe 349g, from the vehicle wind. In the structure of this modified example, the exhaust gas separated by the gas-liquid separator 348G flows through an exhaust gas conduit 349G and is discharged from the back-side of the vehicle.

As mentioned above, the flow of the exhaust gas or the air is used to protect the water, which is separated by the gas-liquid separator 348 and is released from the outlet, from the vehicle wind. The outlet of the exhaust gas or the air may not have a circular cross section but may have a cross section in any suitable shape.

In the fuel cell vehicle 310 of the fourth embodiment, the exhaust gas from the humidifier 46 goes through gas liquid separation in the gas-liquid separator 348, and the separated water and exhaust gas are released backward the rear wheel on the side of the driver's seat. The position of the release of the separated water and exhaust gas is not restricted to the backward of the rear wheel on the side of the driver's seat.

The separated water and exhaust gas may be released from any suitable position, for example, the forward of the rear wheel on the side of the driver's seat, the backward or forward of the rear wheel on the side of the front passenger's seat, the backward or forward of the front wheel on the side of the driver's seat or on the side of the front passenger's seat, or the backward or forward of the center of the vehicle.

Figure 25:
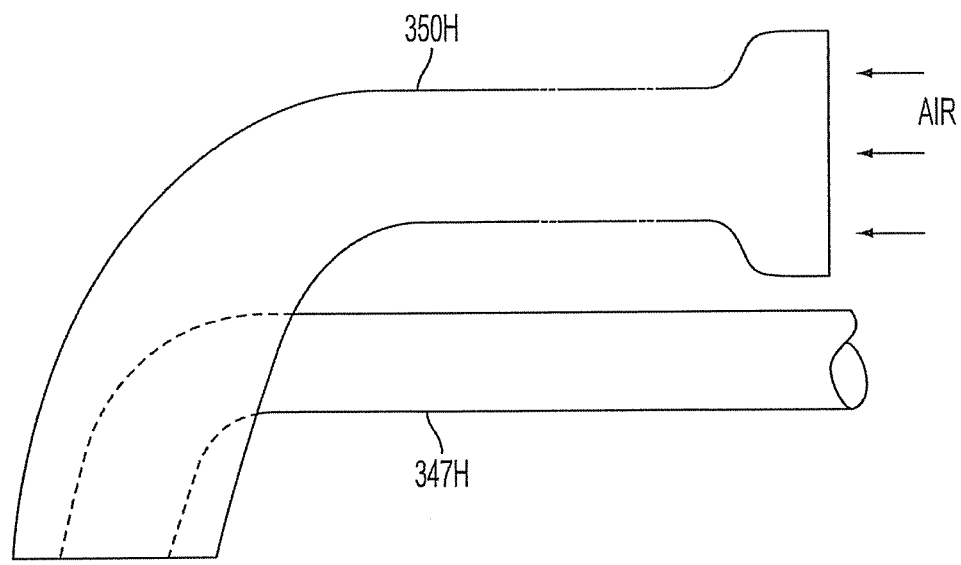
FIG. 25 shows another modified example of the structure of an air supply discharge system 40 of the fourth embodiment.
Figure 26:
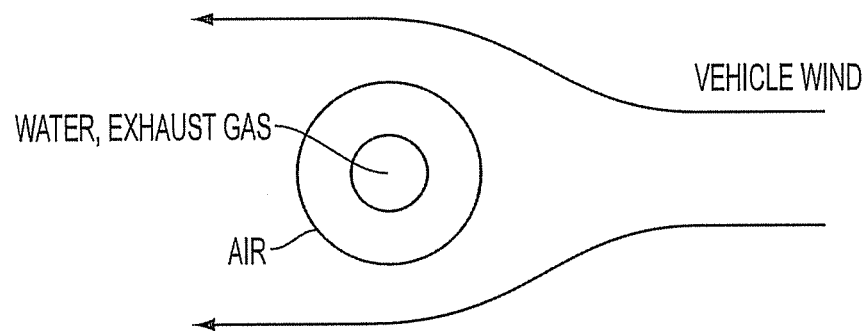
FIG. 26 shows vehicle wind relative to released water and exhaust gas in the modified structures.

In the fuel cell vehicle 310 of the fourth embodiment, the exhaust gas from the humidifier 46 goes through gas liquid separation in the gas-liquid separator 348, and the separated exhaust gas is discharged to protect the separated and released water from the vehicle wind. One modified structure omits the gas-liquid separator 348 to directly release the water-containing exhaust gas from the humidifier 46, while regulating the air flow to protect the water-containing exhaust gas from the vehicle wind. For example, in a modified structure of FIG. 25, an exhaust conduit 347H and an air duct 350H are arranged to locate the outlet of the exhaust conduit 347H for discharge of the water-containing exhaust gas from the humidifier 46 on the center of the air duct 350H for guiding the flow of the air from the front of the vehicle. In this modified structure, the surrounding air protects the water-containing exhaust gas from the vehicle wind.

E. Fifth Embodiment

Figure 27:
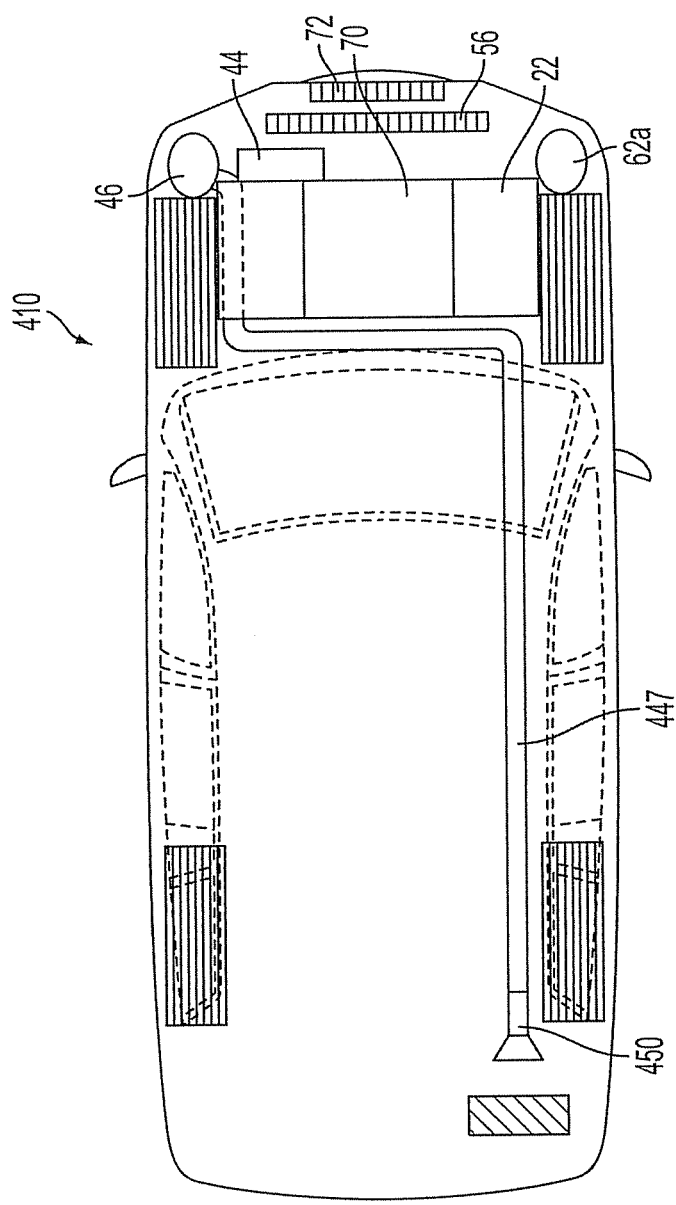
FIG. 27 is a plan view showing a plane layout of devices mounted on a fuel cell vehicle 410 in a fifth embodiment.

A fuel cell vehicle 410 in a fifth embodiment of the invention is discussed below. FIG. 27 is a plan view showing a plane layout of the release system of the air supply discharge system 40 in the fuel cell vehicle 410 of the fifth embodiment. The fuel cell vehicle 410 of the fifth embodiment has similar structure to that of the fuel cell vehicle 310 of the fourth embodiment, except the different exhaust process in the air supply discharge system 40. In order to avoid duplicated explanation, the like constituents of the fuel cell vehicle 410 of the fifth embodiment to those of the fuel cell vehicle 310 of the fourth embodiment are expressed by the like numerals and are omitted from the detailed description.

Like the fuel cell system 320 mounted on the fuel cell vehicle 310 of the fourth embodiment shown in FIG. 13, in a fuel cell system mounted on the fuel cell vehicle 410 of the fifth embodiment, the exhaust gas containing water, which is produced through the power generation in the fuel cell stack 22, in the form of steam is introduced to the humidifier 46 to humidify the air that is pressurized by the air compressor 44 and is fed to the fuel cell stack 22 via the air supply conduit 42. The steam-containing exhaust gas then flows trough an exhaust conduit 447 to the vicinity of the rear wheel on the side of the driver's seat, and is released from a release conduit 450 to the atmosphere.

Figure 28:
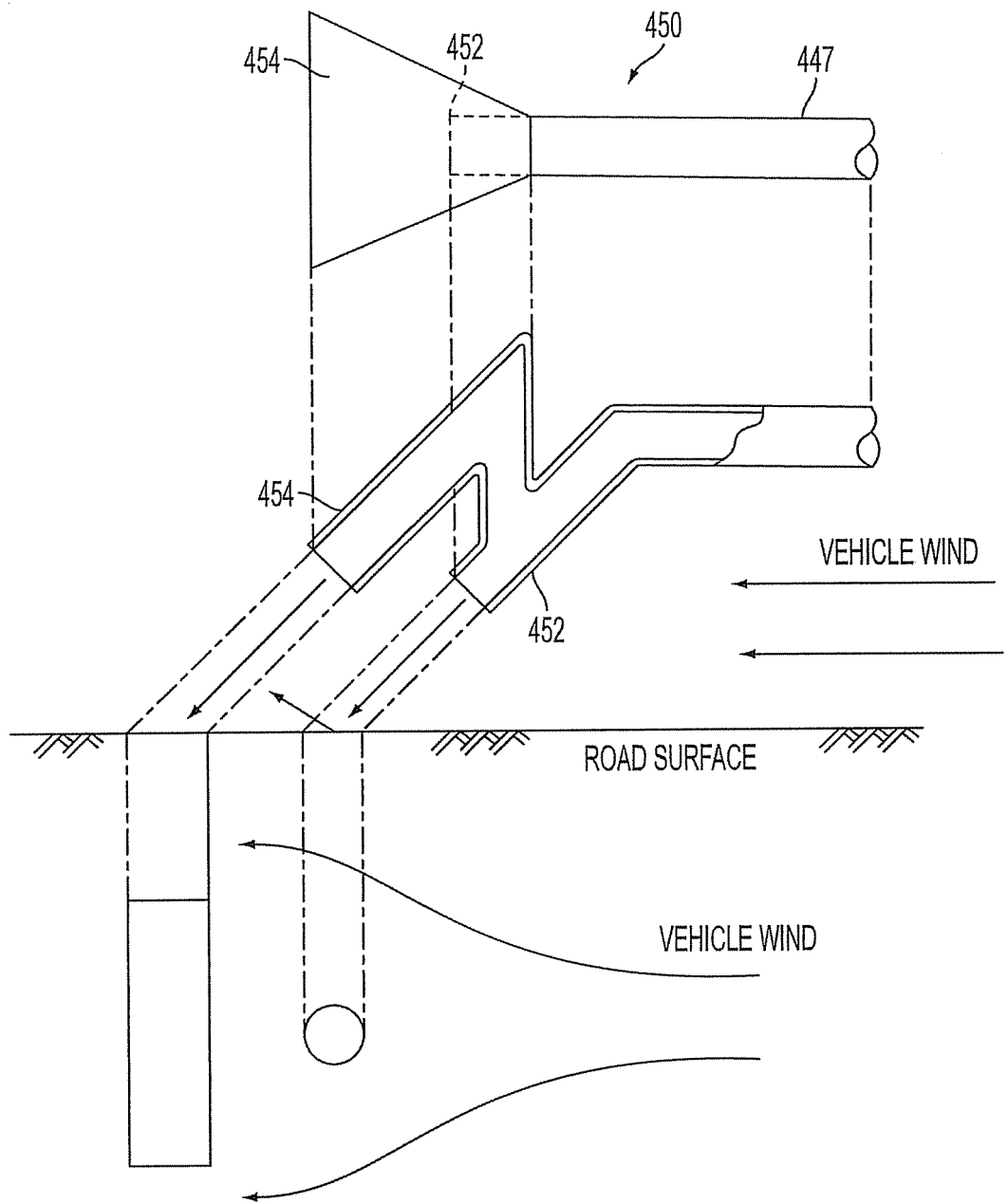
FIG. 28 shows the structure and the functions of a release conduit 450.

FIG. 28 shows the structure and the functions of the release conduit 450. The top drawing of FIG. 28 is a top view of the release conduit 450, the center drawing is a side sectional view of the release conduit 450, and the bottom drawing shows the vehicle wind relative to the water released from a lower pipe 452 and the exhaust gas released from an upper pipe 454. As illustrated, the release conduit 450 has the lower pipe 452 that is bent downward from the exhaust conduit 447 to release the water and the exhaust gas obliquely back-downward, and the upper pipe 454 that is branched off the upper wall of the lower pipe 452, is bent to be parallel to the lower pipe 452, and has a gradually-expanded opening area to emit the exhaust gas obliquely back-downward.

Water is released in the following manner from the fuel cell vehicle 410 of the fifth embodiment constructed as discussed above. The exhaust gas flowing from the humidifier 46 through the exhaust conduit 447 partly goes through gas liquid separation in the exhaust conduit 447. The separated water runs with the flow of the exhaust gas along the bottom of the exhaust conduit 447 to the release conduit 450 and is released from the lower pipe 452 of the release conduit 450. The separated exhaust gas flows through the exhaust conduit 447 and is divided in the release conduit 450 to be released from the lower pipe 452 and from the upper pipe 454. Namely the separated water is mostly released from the lower pipe 452, while the separated exhaust gas is released from both the lower pipe 452 and the upper pipe 454. Here it is assumed that water droplets are discharged from beneath the floor on the rear portion of the vehicle during a run. The water droplets immediately after the discharge are partly swirled on the vehicle wind, while the residual water droplets reach the road surface. Part of the water droplets reaching the road surface are splashed against the road surface and are mostly swirled on the vehicle wind. In the fuel cell vehicle 410 of the fifth embodiment, however, the flow of the exhaust gas is released from the upper pipe 454 of the release conduit 450 to form the wide air curtain behind the water released from the lower pipe 452. The air curtain of the exhaust gas effectively reduces the potential effects of the vehicle wind on the falling water, and restrains the water splash against the road surface from being swirled on the vehicle wind. Namely the air curtain of the exhaust gas restricts the motions of the water droplets reaching the road surface.

As described above, the fuel cell vehicle 410 of the fifth embodiment has the release conduit 450, which includes the lower pipe 452 that is bent downward to release the water and the exhaust gas obliquely back-downward, and the upper pipe 454 that is branched off the upper wall of the lower pipe 452, is bent to be parallel to the lower pipe 452, and has the gradually-expanded opening area to emit the exhaust gas obliquely back-downward. This structure releases water from the lower pipe 452 of the release conduit 450, while emitting the exhaust gas from the upper pipe 454 to form the wide air curtain behind the released water. The air curtain of the exhaust gas desirably reduces the potential effects of the vehicle wind on the falling water, and restrains the water splash against the road surface from being swirled on the vehicle wind. The arrangement of this embodiment prevents potential troubles such that the released water is scattered on other vehicles running on the side and behind.

Figure 29:
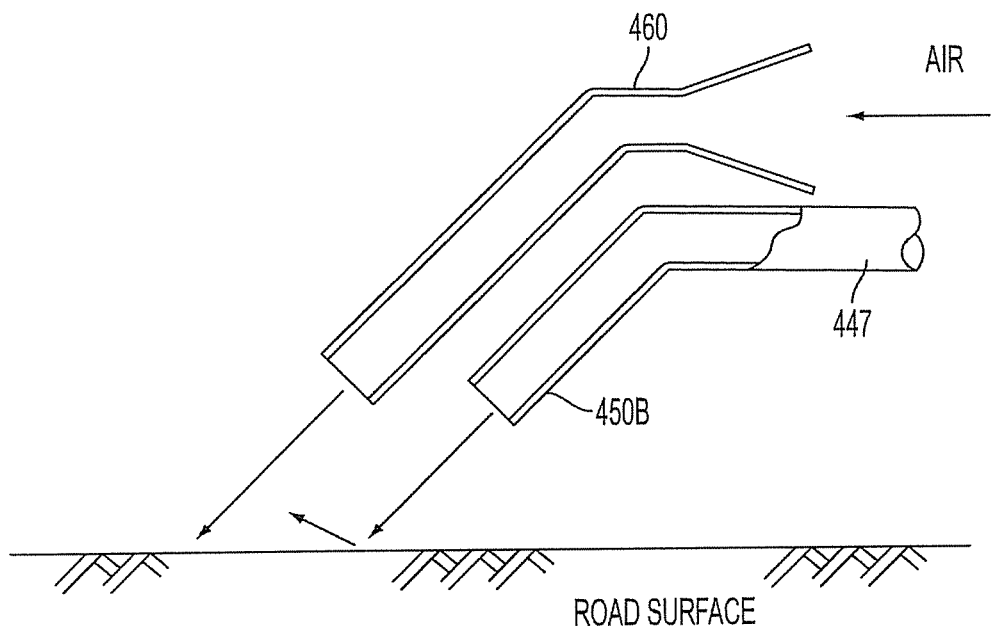
FIG. 29 shows the structure and the functions of an air supply discharge system in one modified example of the fifth embodiment.

In the fuel cell vehicle 410 of the fifth embodiment, the release conduit 450 has the lower pipe 452 and the upper pipe 454 to form the wide air curtain of the exhaust gas behind the released water. A gas other than the exhaust gas, for example, the air may be used to form the air curtain behind the released water. For example, a modified structure of FIG. 29 has a release conduit 450B extended from the exhaust conduit 447 and an air duct 460 arranged behind the release conduit 450B to form the wide air curtain of the air flow guided from the front of the vehicle.

Figure 30:
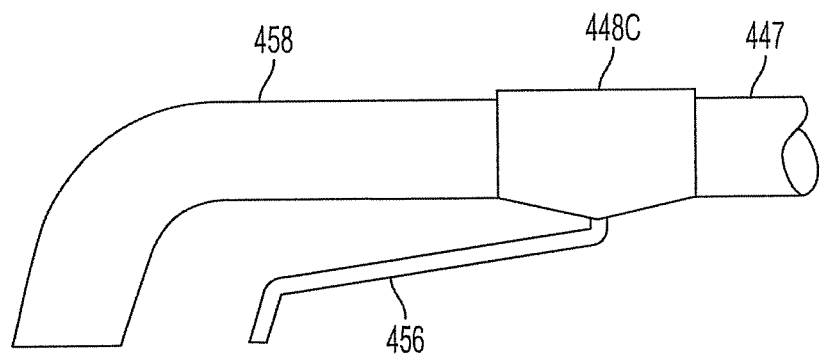
FIG. 30 shows another modified example of the structure of the air supply discharge system 40 of the fifth embodiment.
Figure 31:
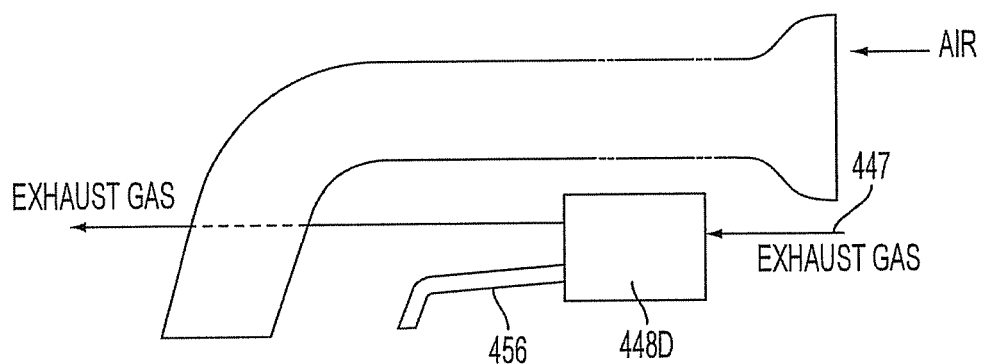
FIG. 31 shows another modified example of the structure of the air supply discharge system 40 of the fifth embodiment.

In the fuel cell vehicle 410 of the fifth embodiment, the exhaust gas from the humidifier 46 is not introduced to a gas-liquid separator but flows through the exhaust conduit 447 to the release conduit 450 to be released to the atmosphere. The exhaust gas from the humidifier 46 may alternatively go through gas liquid separation in a gas liquid separator, prior to release to the atmosphere. For example, one modified structure of FIG. 30 includes a gas-liquid separator 448C attached to the exhaust conduit 447, a water release conduit 456 for release of the water separated by the gas-liquid separator 448C, and an exhaust gas conduit 458 located behind the outlet of the water release conduit 456 for discharge of the exhaust gas separated by the gas-liquid separator 448C to form the wide air curtain of the exhaust gas. Another modified structure of FIG. 31 includes a gas-liquid separator 448D attached to the exhaust conduit 447, the water release conduit 456 for release of the water separated by the gas-liquid separator 448D, and an air duct 460 located behind the outlet of the water release conduit 456 to form the wide air curtain of the air flow guided from the front of the vehicle.

Figure 32:
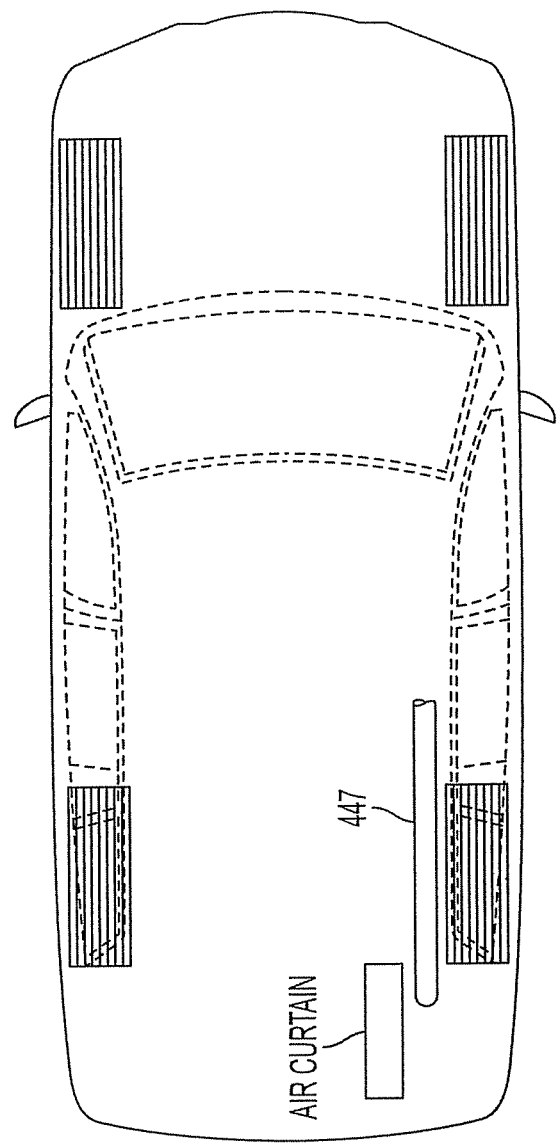
FIG. 32 shows position of an air curtain in one example.
Figure 33:
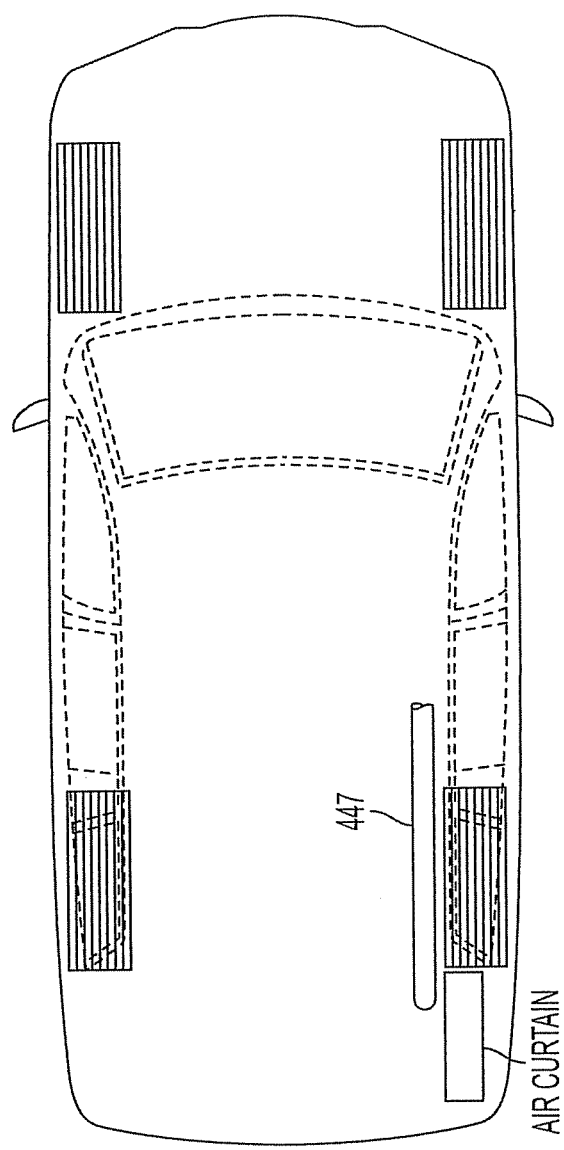
FIG. 33 show position in another example.

In the fuel cell vehicle 410 of the fifth embodiment, the wide air curtain is formed behind the released water. The air curtain may be formed at any suitable location other than the backward of the released water, as long as the air curtain can reduce the potential effects of the vehicle wind on the released water and restrain the water splash against the road surface from being swirled on the vehicle wind. For example, in a modified example of FIG. 32, the air curtain is formed inside the outlet of the exhaust conduit 447 in the vehicle. In another modified example of FIG. 33, the air curtain is formed outside the outlet of the exhaust conduit 447 in the vehicle. In any structure, the air curtain may be formed by the flow of the exhaust gas or by the air flow. The location of the air curtain is required to be in the vicinity of the released water. The air curtain may be formed to surround the released water, for example, behind and on one side or both sides of the released water.

In the fuel cell vehicle 410 of the fifth embodiment, the exhaust gas from the air supply discharge system 40 flows through the exhaust conduit 447 to the release conduit 450, which is located in the vicinity of the rear wheel on the side of the driver's seat, and is discharged from the release conduit 450 to the atmosphere. The exhaust gas from the air supply discharge system 40 may alternatively be discharged from the vicinity of the rear wheel on the side of the front passenger' seat or from the rear center of the vehicle.

F. Sixth Embodiment

Figure 34:
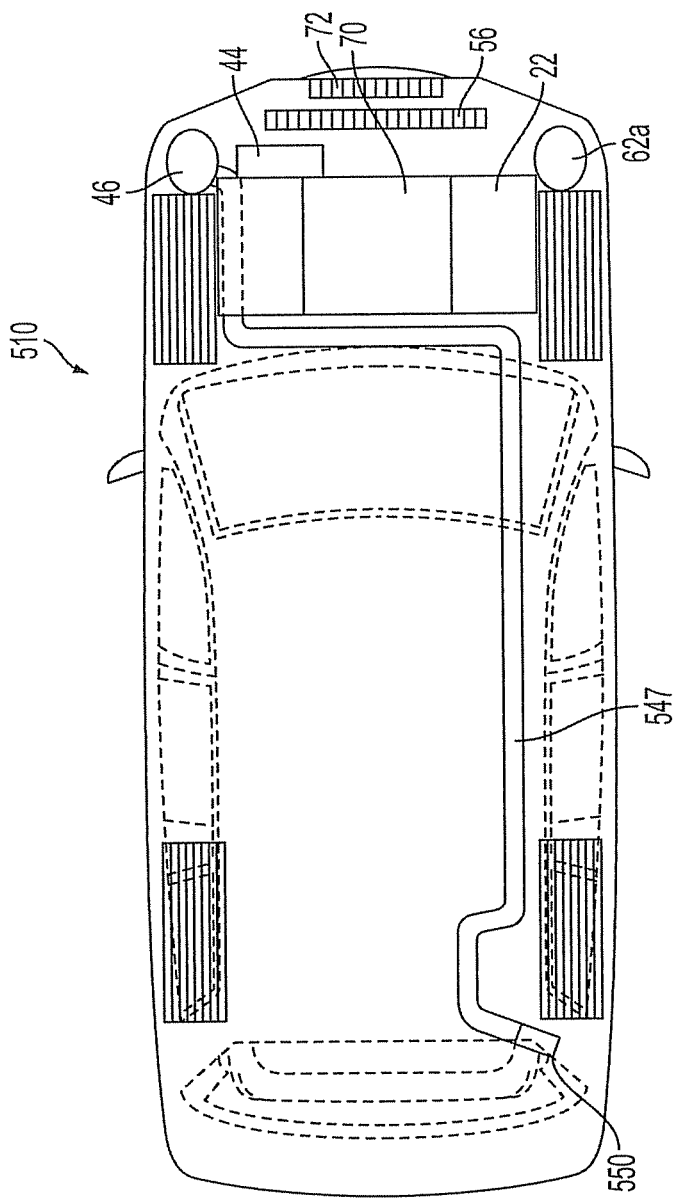
FIG. 34 is a plan view showing a plane layout of devices mounted on a fuel cell vehicle 510 in a sixth embodiment.
Figure 35:
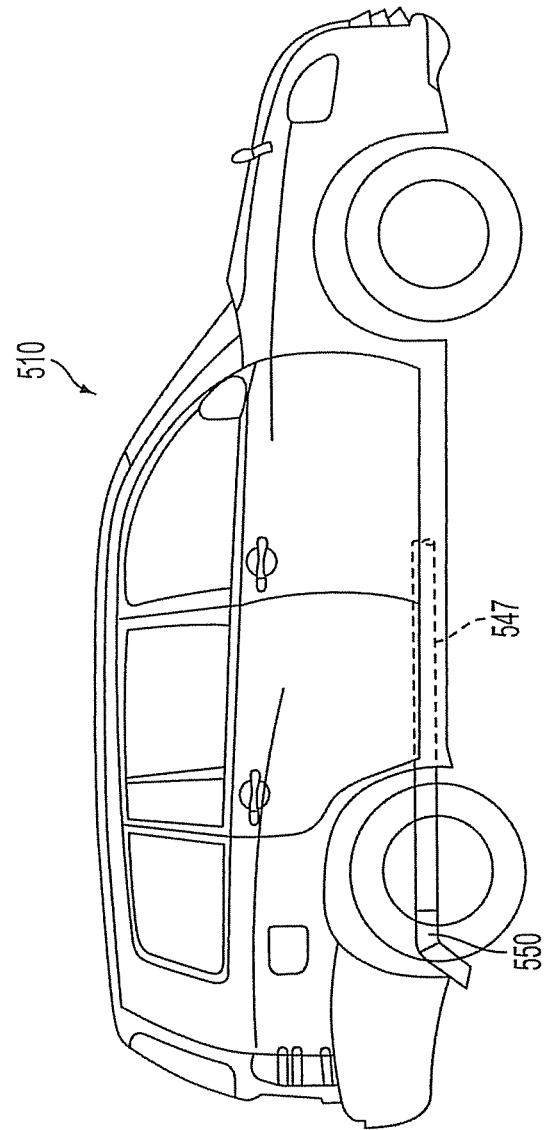
FIG. 35 is a side view showing a layout of an exhaust system in the fuel cell vehicle 510 of the sixth embodiment.
Figure 36:
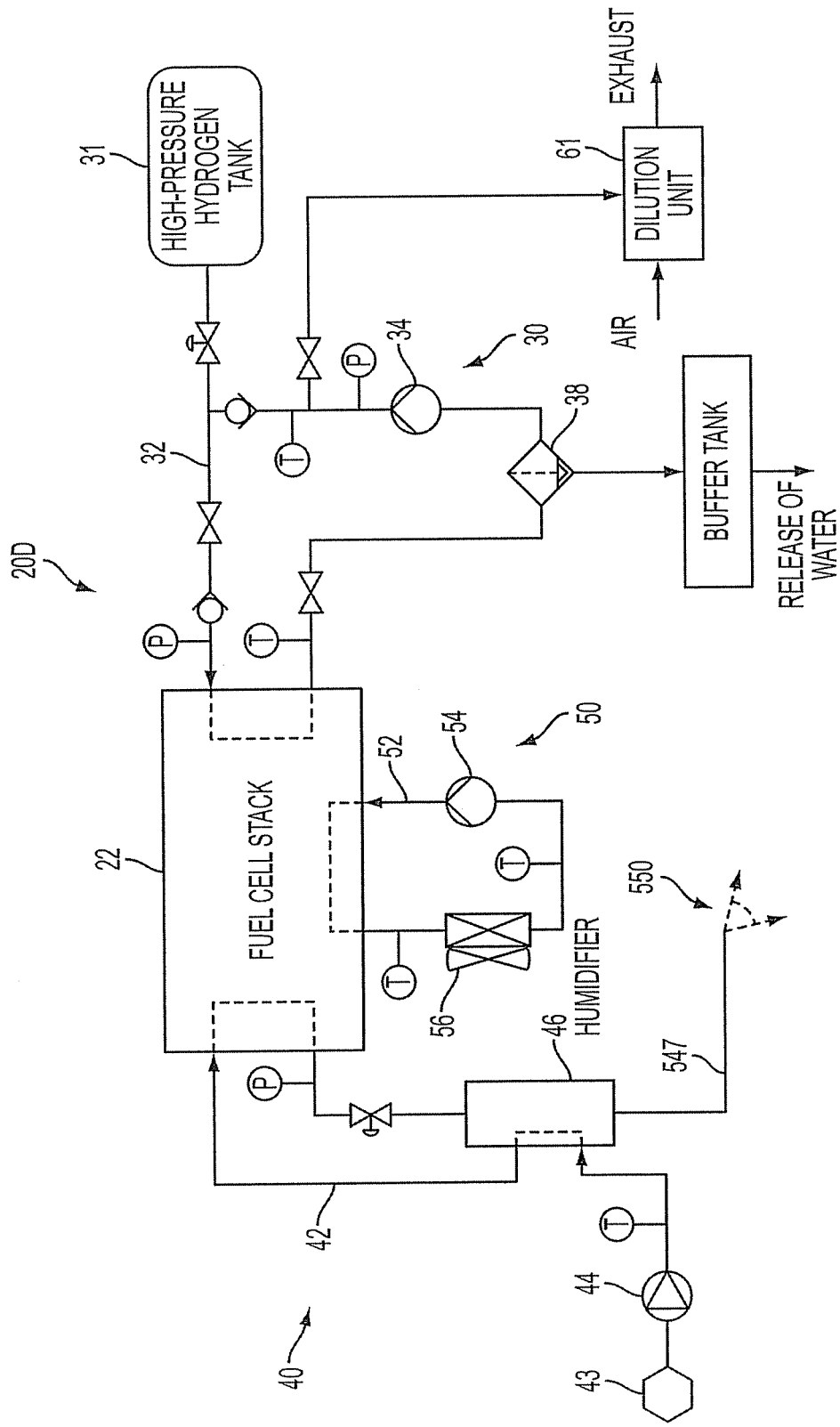
FIG. 36 is a system diagram schematically showing the configuration of a fuel cell system 520 that includes the fuel cell stack 22 and is mounted on the fuel cell vehicle 510 of the sixth embodiment.

A fuel cell vehicle 510 in a sixth embodiment of the invention is discussed below. FIG. 34 is a plan view showing a plane layout of devices mounted on the fuel cell vehicle 510 of the sixth embodiment. FIG. 35 is a side view showing a layout of an exhaust system in the fuel cell vehicle 510 of the sixth embodiment. FIG. 36 is a system diagram schematically showing the configuration of a fuel cell system 520 that includes the fuel cell stack 22 and is mounted on the fuel cell vehicle 510 of the sixth embodiment. As shown in FIG. 36, the fuel cell system 520 mounted on the fuel cell vehicle 510 of the sixth embodiment has similar configuration to that of the fuel cell system 320 mounted on the fuel cell vehicle 310 of the fourth embodiment shown in FIG. 13, except the different exhaust process adopted in the air supply discharge system 40. In order to avoid duplicated explanation, the like constituents of the fuel cell system 520 mounted on the fuel cell vehicle 510 of the sixth embodiment to those of the fuel cell system 320 mounted on the fuel cell vehicle 310 of the fourth embodiment are expressed by the like numerals and are omitted from the detailed description. The like constituents of the fuel cell vehicle 510 of the sixth embodiment other than the fuel cell system 520 to those of the fuel cell vehicle 310 of the fourth embodiment are also expressed by the like numerals.

In the fuel cell system 520 mounted on the fuel cell vehicle 510 of the sixth embodiment, the exhaust gas containing water, which is produced through the power generation in the fuel cell stack 22, in the form of steam is introduced to the humidifier 46 to humidify the air that is pressurized by the air compressor 44 and is fed to the fuel cell stack 22 via the air supply conduit 42, as shown in FIG. 36. The steam-containing exhaust gas then flows through an exhaust conduit 547 to a release mechanism 550 located in the vicinity of the rear wheel on the side of the driver's seat, and is released from the release mechanism 550 to the atmosphere, as shown in FIGS. 34 and 35.

Figure 37A:
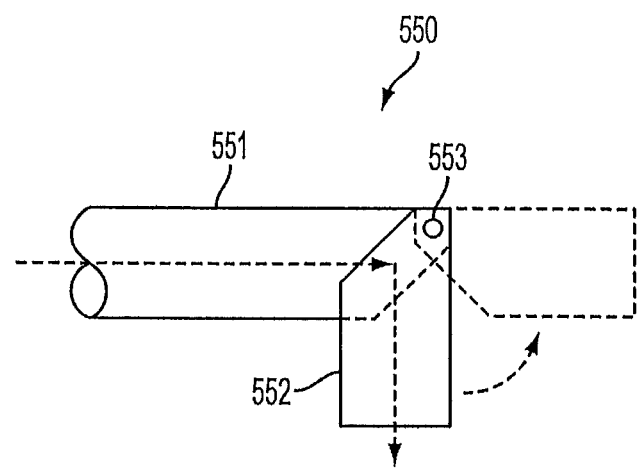
FIGS. 37A and 37B show the structure of a release mechanism 550 and a process of emitting exhaust gas.
Figure 37B:
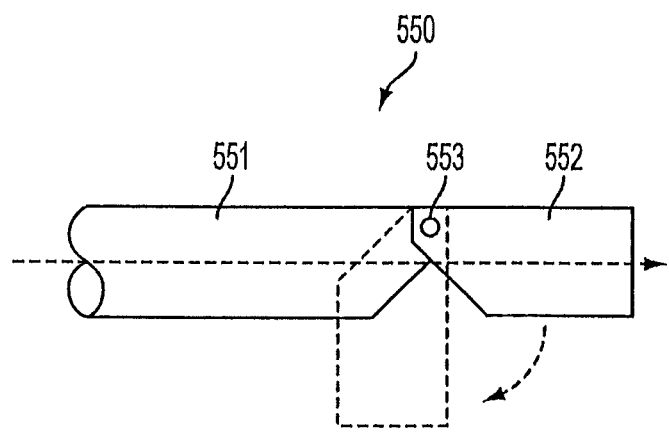

FIGS. 37A and 37B show the structure of the release mechanism 550 and the process of emitting the exhaust gas. FIG. 37A shows the process of emitting the exhaust gas in the case of a low flow rate of the exhaust gas from the fuel cell stack 22. FIG. 37B shows the process of emitting the exhaust gas in the case of a high flow rate of the exhaust gas from the fuel cell stack 22. The release mechanism 550 includes a stationary pipe 551 that has a cut end at an angle of approximately 45 degrees and is arranged in a substantially horizontal orientation to connect with the exhaust conduit 547, and a short movable pipe 552 that has a joint cut end at an angle of approximately 45 degrees for linkage with the stationary pipe 551. The edge of the cut end of the stationary pipe 551 and the edge of the cut end of the movable pipe 552 are linked together in a pivotally rotatable manner by means of a hinge 553. The movable pipe 552 is pivotally rotatable about the hinge 553 by the discharge force of the gas from the stationary pipe 551. With an increase in gas flow rate from the stationary pipe 551 to enhance the discharge force of the gas, the gas release direction of the movable pipe 552 changes from the vertically downward direction to the horizontal direction. The movable range of the movable pipe 552 has the lateral directional component and the backward directional component of the vehicle as clearly shown in the layout of FIG. 34.

The exhaust gas and the water produced by the fuel cell stack 22 are released in the following manner from the fuel cell vehicle 510 of the sixth embodiment constructed as discussed above. The exhaust gas containing water produced by the fuel cell stack 22 is introduced to the humidifier 46 to humidify the air pressurized by the air compressor 44, flows through the exhaust conduit 547, and is eventually discharged from the release mechanism 550. The high loading of the fuel cell stack 22 increases the quantity of water discharged from the fuel cell stack 22 and the flow rate of the exhaust gas. Under the low loading condition of the fuel cell stack 22, the low flow rate of the exhaust gas sets the movable pipe 552 vertically downward to release the water together with the exhaust gas vertically downward. Under the high loading condition of the fuel cell stack 22, on the other hand, the high flow rate of the exhaust gas sets the movable pipe 552 horizontally and obliquely backward the vehicle to release the water together with the exhaust gas horizontally and obliquely backward the vehicle. The high loading state of the fuel cell stack 22 means consumption of large energy to drive the vehicle and includes, for example, the state of driving the vehicle at a relatively high speed and the state of accelerating the vehicle with a relatively large acceleration. The low loading state of the fuel cell stack 22 means consumption of small energy to drive the vehicle and includes, for example, the stop state of the vehicle, the state of driving the vehicle at a relatively low speed, and the state of decelerating the vehicle. When the vehicle is at a stop, runs at a relatively low speed, or decelerates, the water produced by the fuel cell stack 22 is released vertically downward. When the vehicle runs at a relatively high speed or accelerates with a large acceleration, the water produced by the fuel cell stack 22 is released horizontally and obliquely backward the vehicle. This arrangement reduces the potential effects of the vehicle wind and thus prevents the released water from being swirled on the vehicle wind. This arrangement also lowers the relative speed of the released water to the road surface and thus desirably restrains splash of water against the road surface. When the vehicle runs at a relatively high speed or accelerates with a large acceleration, the release of water from the fuel cell stack 22 horizontally and obliquely backward the vehicle desirably prevents the released water from being swirled on the vehicle wind before reaching the road surface, and restrains the released water from being splashed against the road surface and swirled on the vehicle wind. When the vehicle is at a stop, runs at a relatively low speed, or decelerates, on the other hand, the release of water from the fuel cell stack 22 vertically downward desirably prevents the released water from splashing about on any pedestrian walking on the road shoulder or any building or construction facing the road.

As described above, the fuel cell vehicle 510 of the sixth embodiment has the release mechanism 550 that releases the exhaust gas and the water from the fuel cell stack 22 vertically downward in response to the low flow rate of the exhaust gas from the fuel cell stack 22, while releasing the exhaust gas and the water from the fuel cell stack 22 horizontally and obliquely backward the vehicle in response to the high flow rate of the exhaust gas from the fuel cell stack 22. This arrangement effectively prevents the released water from splashing about on any pedestrian walking on the road shoulder or any building or construction facing the road, and restrains the released water from being swirled on the vehicle wind. The release mechanism 550 is located behind the rear wheel on the side of the driver's seat having the less potential effects of the vehicle wind. This further effectively prevents the water released from the release mechanism 550 from being swirled on the vehicle wind. The arrangement of this embodiment prevents potential troubles such that the released water is scattered on other vehicles running on the side and behind.

Figure 38A:
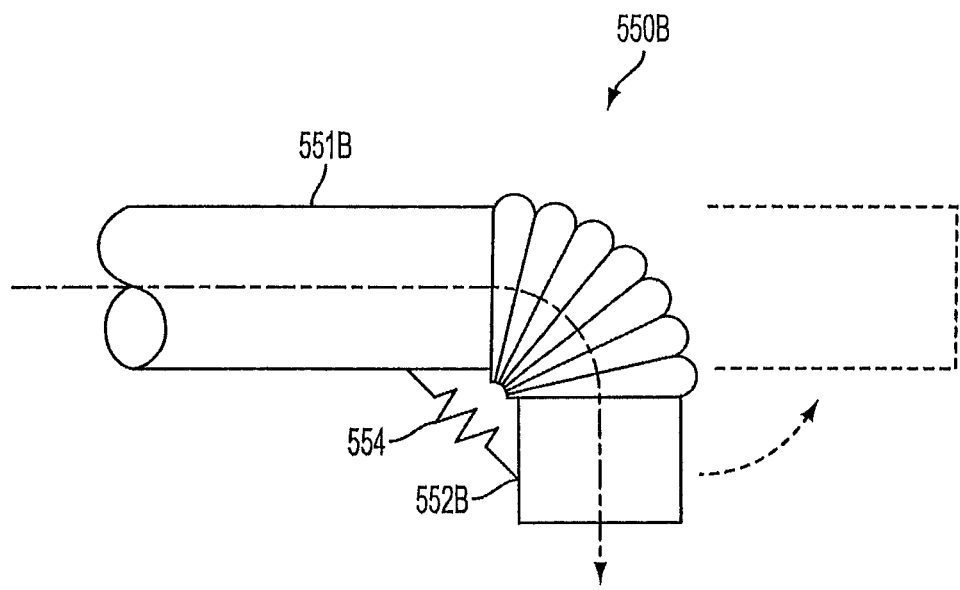
FIGS. 38A and 38B show the structure of a release mechanism 550B in one modified example.
Figure 38B:
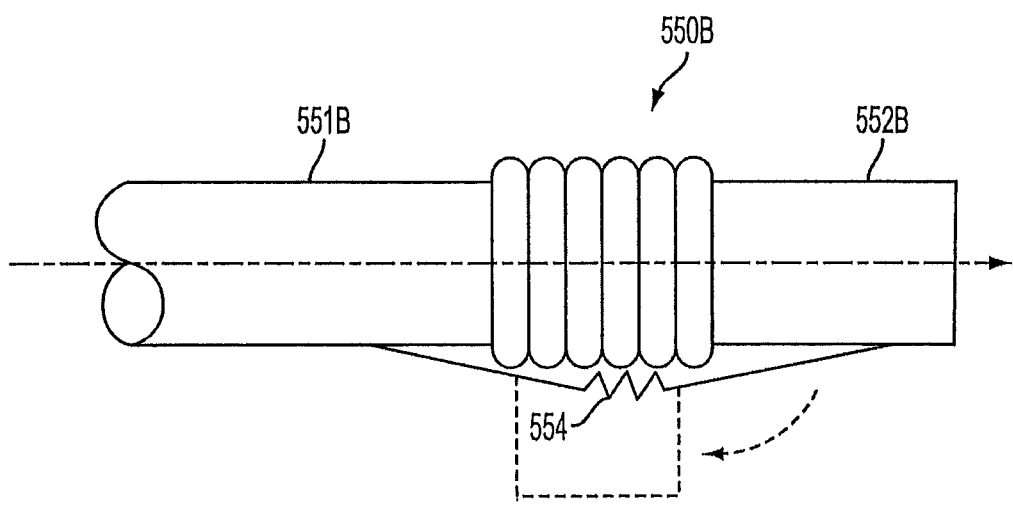

In the fuel cell vehicle 510 of the sixth embodiment, the release mechanism 550 has the movable pipe 552 that is attached to the end of the stationary pipe 551 in a pivotally rotatable manner. In a release mechanism 550B of a modified structure shown in FIGS. 38A and 38B, a bellows flexible pipe 552B is linked to a stationary pipe 551B. A spring 554 is spanned between the stationary pipe 551B and the flexible pipe 552B to apply the tension. The function of the spring 554 makes the opening end of the flexible pipe 552B face vertically downward in response to the low gas flow rate close to zero, while lifting the flexible pipe 552B up and making the opening end of the flexible pipe 5523 face substantially horizontally in response to the high gas flow rate.

In the fuel cell vehicle 510 of the sixth embodiment, the release mechanism 550 is designed to release the exhaust gas and the water from the fuel cell stack 22 in the direction having the lateral directional component and the backward directional component of the vehicle in response to the varying flow rate of the exhaust gas. The release mechanism 550 may alternatively be designed to release the exhaust gas and the water from the fuel cell stack 22 in the direction having only the lateral directional component of the vehicle in response to the varying flow rate of the exhaust gas. The release mechanism 550 may otherwise be designed to release the exhaust gas and the water from the fuel cell stack 22 in the direction having only the backward directional component of the vehicle in response to the varying flow rate of the exhaust gas.

In the fuel cell vehicle 510 of the sixth embodiment, the exhaust gas and the water produced by the fuel cell stack 22 are released backward the rear wheel on the side of the driver's seat. The position of the release of the exhaust gas and the water from the fuel cell stack 22 is not restricted to the backward of the rear wheel on the side of the driver's seat. The water and the exhaust gas may be released from any suitable position, for example, the forward of the rear wheel on the side of the driver's seat, the backward or forward of the rear wheel on the side of the front passenger's seat, the backward or forward of the front wheel on the side of the driver's seat or on the side of the front passenger's seat, or the backward or forward of the center of the vehicle.

G. Seventh Embodiment

Figure 39:
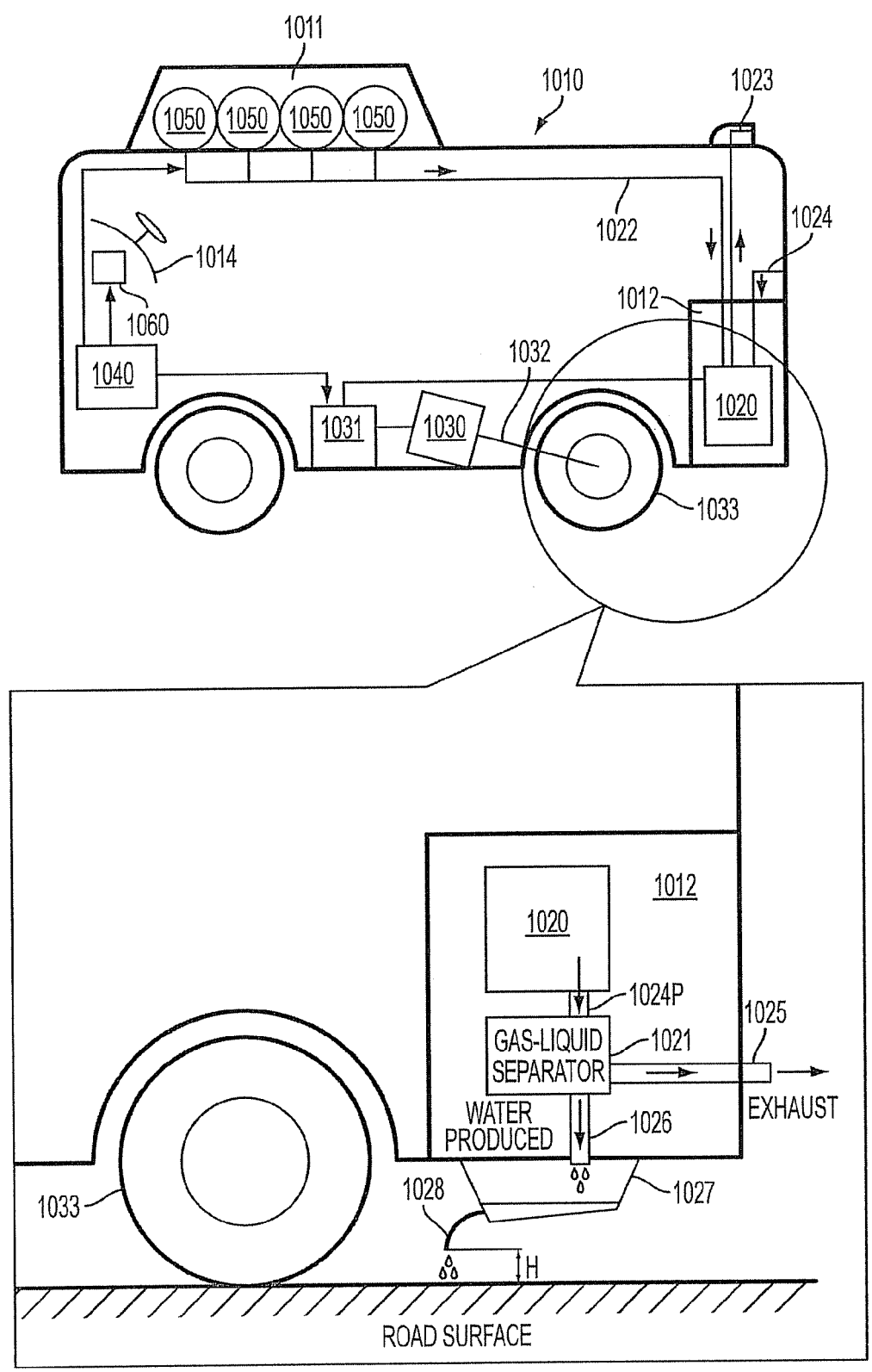
FIG. 39 schematically illustrates the configuration of a vehicle 1010 in a seventh embodiment of the invention.

FIG. 39 schematically illustrates the configuration of a vehicle 1010 in a seventh embodiment of the invention. The vehicle 1010 has a stack of fuel cells 1020 located in a rear fuel cell chamber 1012 as a power source and is driven by the power of a motor 1030. The motor 1030 may be any of diverse types of motors but is a synchronous motor in this embodiment. An inverter 1031 functions to convert direct current output from the stack of fuel cells 1020 into three-phase alternating current. The motor 1030 is driven by the three-phase alternating current. The power of the motor 1030 is transmitted to wheels 1033 via a rotating shaft 1032 to drive the vehicle 1010.

The stack of fuel cells 1020 generates electric power through electrochemical reactions of hydrogen with oxygen. The stack of fuel cells 1020 may be any of various types of fuel cells but are polymer electrolyte fuel cells in this embodiment. A supply of the air is fed to oxygen electrodes or cathodes of the fuel cells 1020 via a supply conduit 1024. A supply of hydrogen is sequentially fed from multiple hydrogen tanks 1050 located in a roof hydrogen tank chamber 1011 via a supply conduit 1022 to hydrogen electrodes or anodes of the fuel cells 1020.

A control unit 1040 controls the operations of the inverter 1031 and other devices mounted on the vehicle 1010. The control unit 1040 is constructed as a microcomputer including a CPU, a ROM, and a RAM. The control unit 1040 controls the operations of the respective devices and the displays on an instrument panel 1060 located at a driver's seat 1014 according to control programs stored in the ROM. An exhaust system of the cathodes in the fuel cell chamber 1012 is shown in a lower enlarged view. The cathode exhaust from the cathodes of the fuel cells 1020 includes water produced by the electrochemical reactions for power generation. The cathode exhaust flows to a gas-liquid separator 1021 via piping 1024P for separation of liquid water and is discharged from an exhaust pipe 1025. The separated water passes through a drain 1026 and is accumulated in a buffer tank 1027 located below the vehicle 1010. The water accumulated in the buffer tank 1027 is released to the atmosphere via a discharge pipe 1028. The discharge pipe 1028 is arranged ahead of the buffer tank 1027. The bottom face of the buffer tank 1027 is inclined from the higher rear end to the lower front end for smooth release of water from the discharge pipe 1028. A height H of an opening end of the discharge pipe 1028 from the road surface (hereafter referred to as 'opening end height') is set sufficiently low to prevent the released water from being swirled on and scattered by the air current during a run of the vehicle 1010.

In the structure of this embodiment, the anode exhaust from the anodes does not pass through the above exhaust system but is circulated to the supply conduit 1022 for the effective use of remaining unconsumed hydrogen for power generation. The anode exhaust from the anodes may alternatively be discharged with the cathode exhaust from the exhaust system.

Figure 40A:
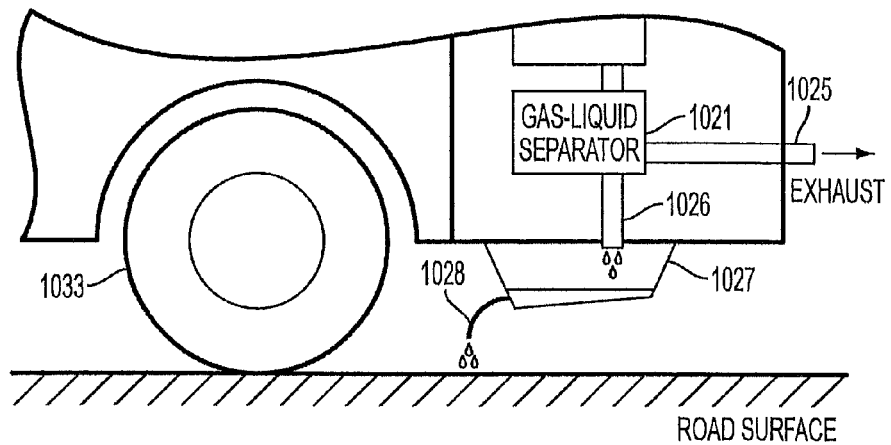
FIGS. 40A, 40B, and 40C show the functions of a buffer tank 1027.
Figure 40B:
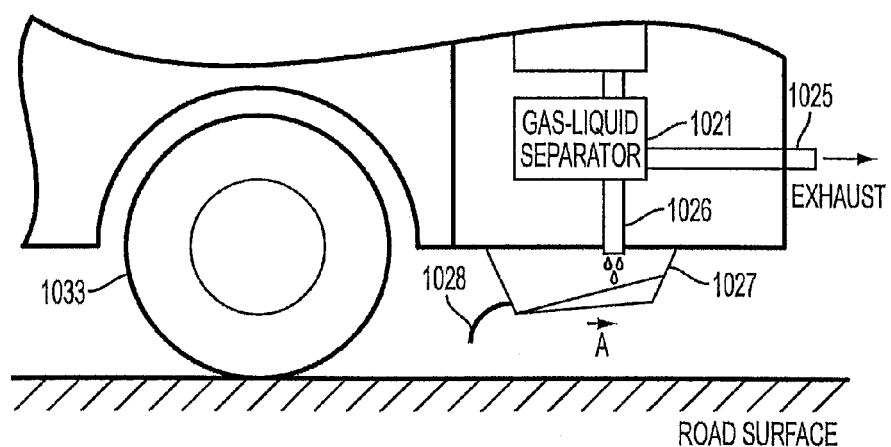
Figure 40C:
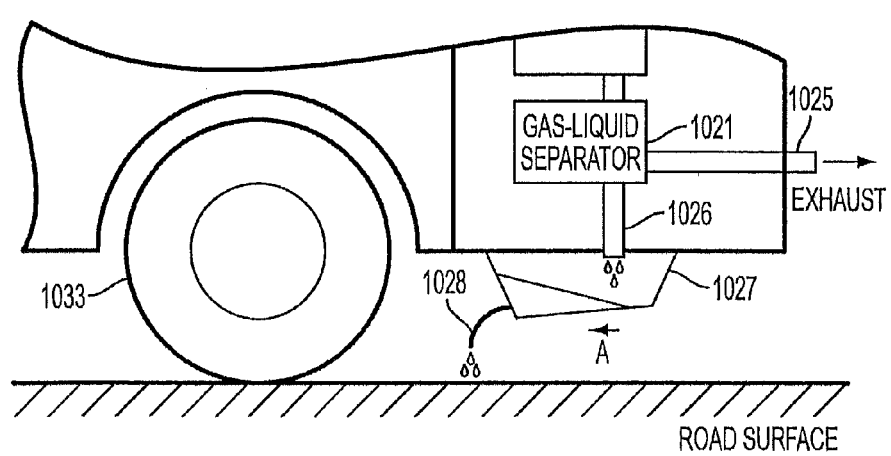

FIGS. 40A, 40B, and 40C show the functions of the buffer tank 1027. The vehicle 1010 is at a stop in FIG. 40A. In this state, the water accumulated in the buffer tank 1027 is released out of the vehicle from the discharge pipe 1028. While the vehicle 1010 is at a stop, no water is swirled on and scattered by the air current.

The vehicle 1010 is under acceleration in FIG. 40B. In this state, the water accumulated in the buffer tank 1027 is pressed backward by the force of inertia 'A' caused by acceleration. This makes the water surface apart from the joint of the discharge pipe 1028 and thereby restrains the water discharge. The restraint of the water discharge lowers the potential for scatter of the discharged water by the air current produced below the vehicle.

The vehicle 1010 is under deceleration in FIG. 40C. In this state, the water accumulated in the buffer tank 1027 is pressed forward by the force of inertia 'A' caused by deceleration. This facilitates discharge of the water from the discharge pipe 1028. The air current produced below the vehicle is weakened under deceleration to relatively reduce scatter of the discharged water. The opening end height of the discharge pipe 1028 is desirably set to a sufficiently low level that restrains scatter of the discharged water under deceleration.

As described above, in the vehicle 1010 of the seventh embodiment, the functions of the buffer tank 1027 and the discharge pipe 1028 provided in the exhaust system effectively restrain discharge of water under acceleration, while facilitating discharge of water under deceleration. During a general run, the vehicle often repeats acceleration and deceleration and does not continue running at a fixed cruising speed. The arrangement of facilitating the water discharge under deceleration and restraining the water discharge under acceleration thus reduces scatter of the discharged water during a run to the level that does not interfere with smooth driving of subsequent and nearby vehicles.

H. Eighth Embodiment

Figure 41:
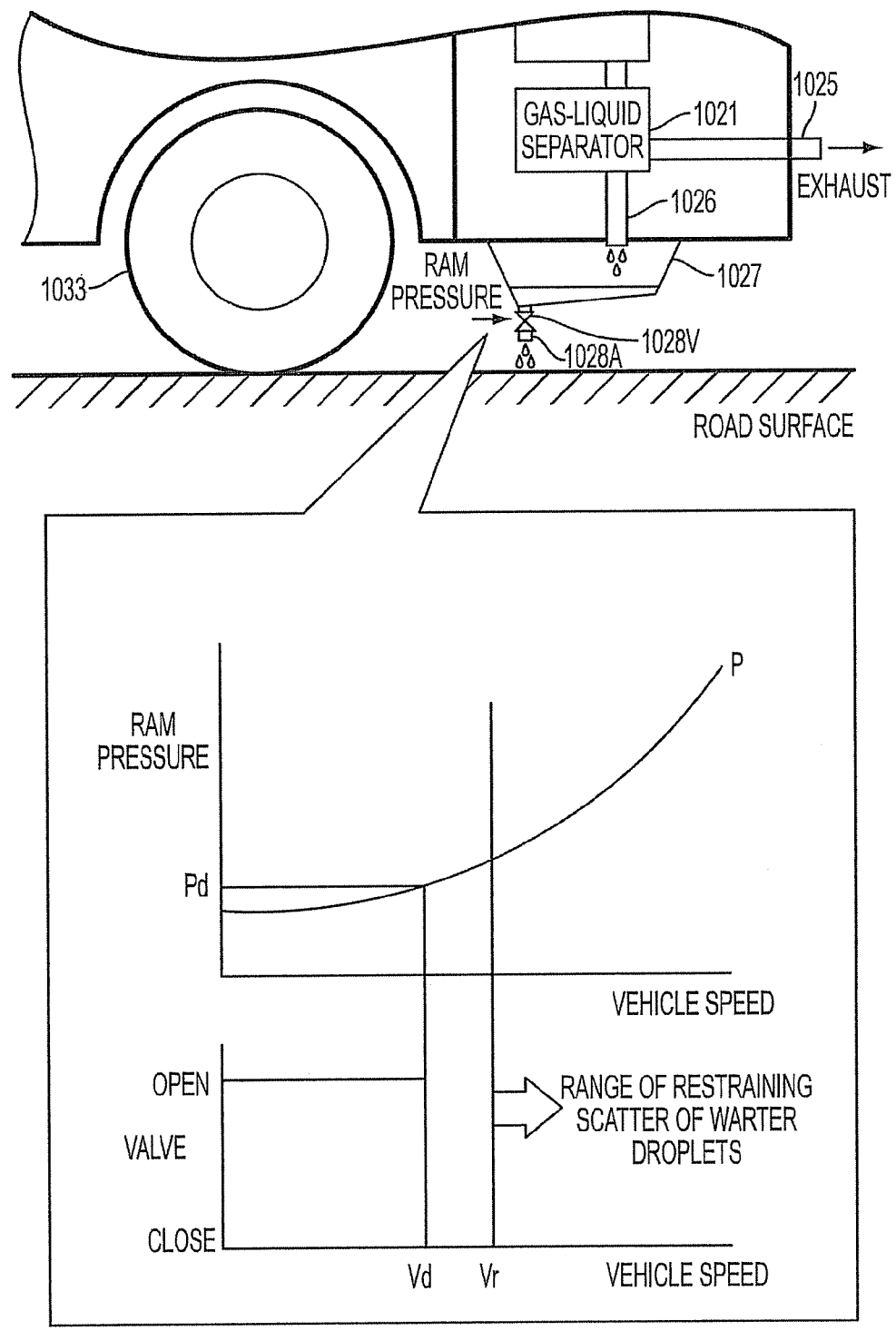
FIG. 41 shows the structure of an exhaust system in an eighth embodiment of the invention.

FIG. 41 shows the structure of an exhaust system in an eighth embodiment of the invention. The structure of the eighth embodiment has a discharge pipe 1028A with a lead valve 1028V below the buffer tank 1027. The lead valve 1028V functions to open and close in response to the ram pressure of the air current during a run of the vehicle, that is, in response to the pressure holding the air current back.

Lower graphs show the functions of the lead valve 1028V. Water discharged from the discharge pipe 1028A is more drastically scattered with an increase in vehicle speed to heighten the air current. When the vehicle speed exceeds a specific level Vr, restraint of the scatter of water droplets is demanded since there is a possibility of interference with smooth driving of subsequent and nearby vehicles. The procedure of this embodiment sets a little lower value than the specific level Vr to a design speed Vd for restraining scatter of water droplets.

The ram pressure increases in proportion to the square of the vehicle speed as shown by a curve P. This curve P gives a ram pressure Pd corresponding to the design speed Vd. In the structure of this embodiment, the operating pressure of the lead valve 1028V is regulated, such that the lead valve 1028V opens in response to the ram pressure of less than the level Pd while closing in response to the ram pressure of not less than the level Pd.

In the vehicle of the eighth embodiment, such regulation fully closes the lead valve 1028V to stop the water discharge when the vehicle speed exceeds the design speed Vd. This arrangement effectively restrains scatter of the discharged water at a level that may interfere with smooth driving of subsequent and nearby vehicles.

In the structure of the eighth embodiment, the discharge pipe 1028A is located below the buffer tank 1027. The discharge pipe 1028A may alternatively be located ahead of the buffer tank 1027, like the structure of the seventh embodiment. It is not essential to fully close the lead valve 1028V when the vehicle speed exceeds the design speed Vd. The mechanism may alternatively reduce the opening of the lead valve 1028V continuously or stepwise according to the vehicle speed.

The lead valve 1028V of the eighth embodiment may be replaced by an electromagnetic valve. This modified structure additionally includes a control unit for controlling the operations of the electromagnetic valve. The control unit reduces the opening of the electromagnetic valve or fully closes the electromagnetic valve when the vehicle speed exceeds the design speed Vd.

Figure 42A:
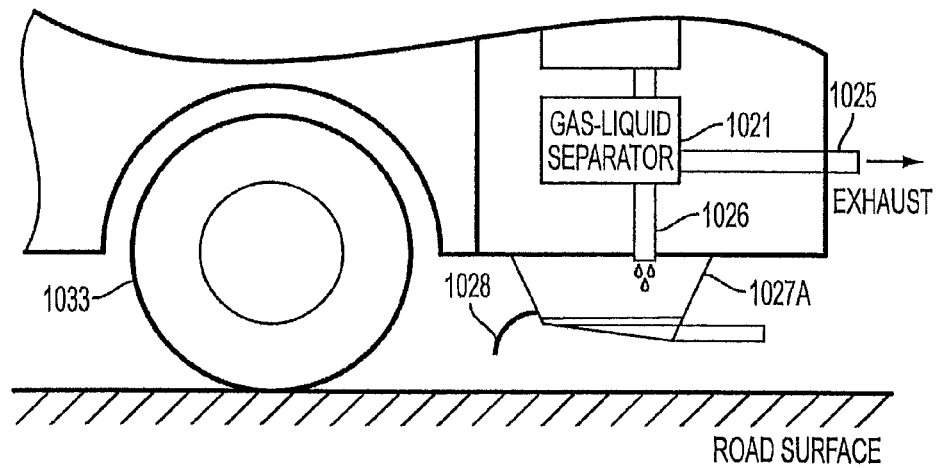
FIGS. 42A, 42B, and 42C show the structure of another exhaust system in a modified example.
Figure 42B:
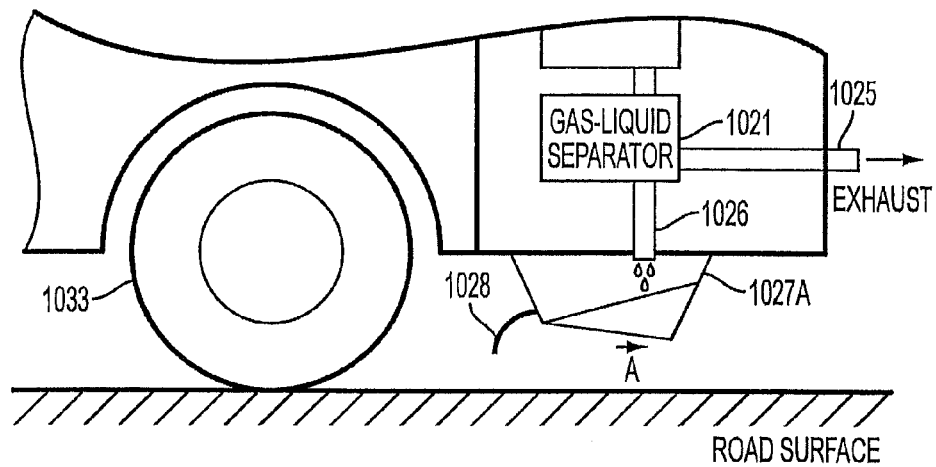
Figure 42C:
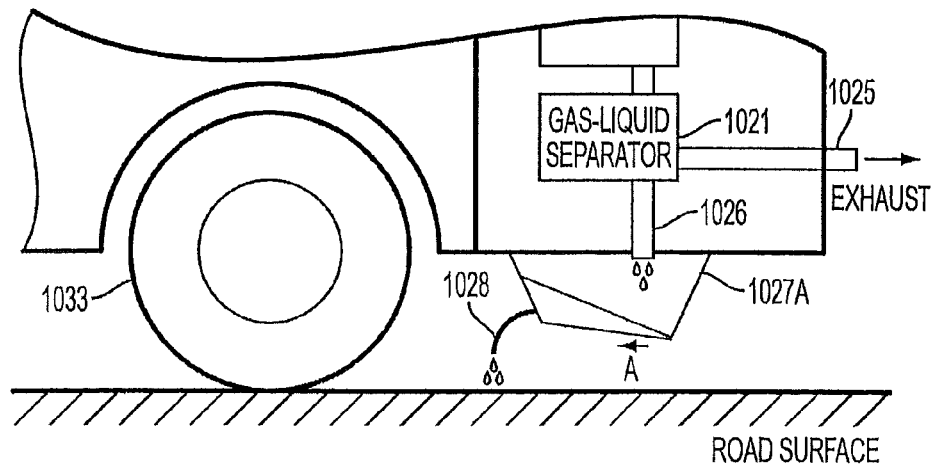

FIGS. 42A, 42B, and 42C show the structure of another exhaust system in a modified example. In this modified example, the bottom face of a buffer tank 1027A is inclined from a higher front end to a lower rear end by a height L. Such inclination makes the water accumulated in the buffer tank 1027A apart from the discharge pipe 1028 even in the steady state as shown in FIG. 42A and thereby restrains the water discharge. This arrangement effectively restrains water discharge during a steady run of the vehicle and thus reduces scatter of the discharged water.

While the vehicle is under acceleration, the force of inertia 'A' functions to restrain the water discharge as shown in FIG. 42B. While the vehicle is under deceleration, on the other hand, the force of inertia 'A' functions to press the accumulated water forward and thereby facilitate the water discharge as shown in FIG. 42C. A run of the vehicle naturally includes a time period of deceleration. The restraint of the water discharge during a steady drive is thus not detrimental to the water accumulation in the buffer tank 1027A.

Figure 43:
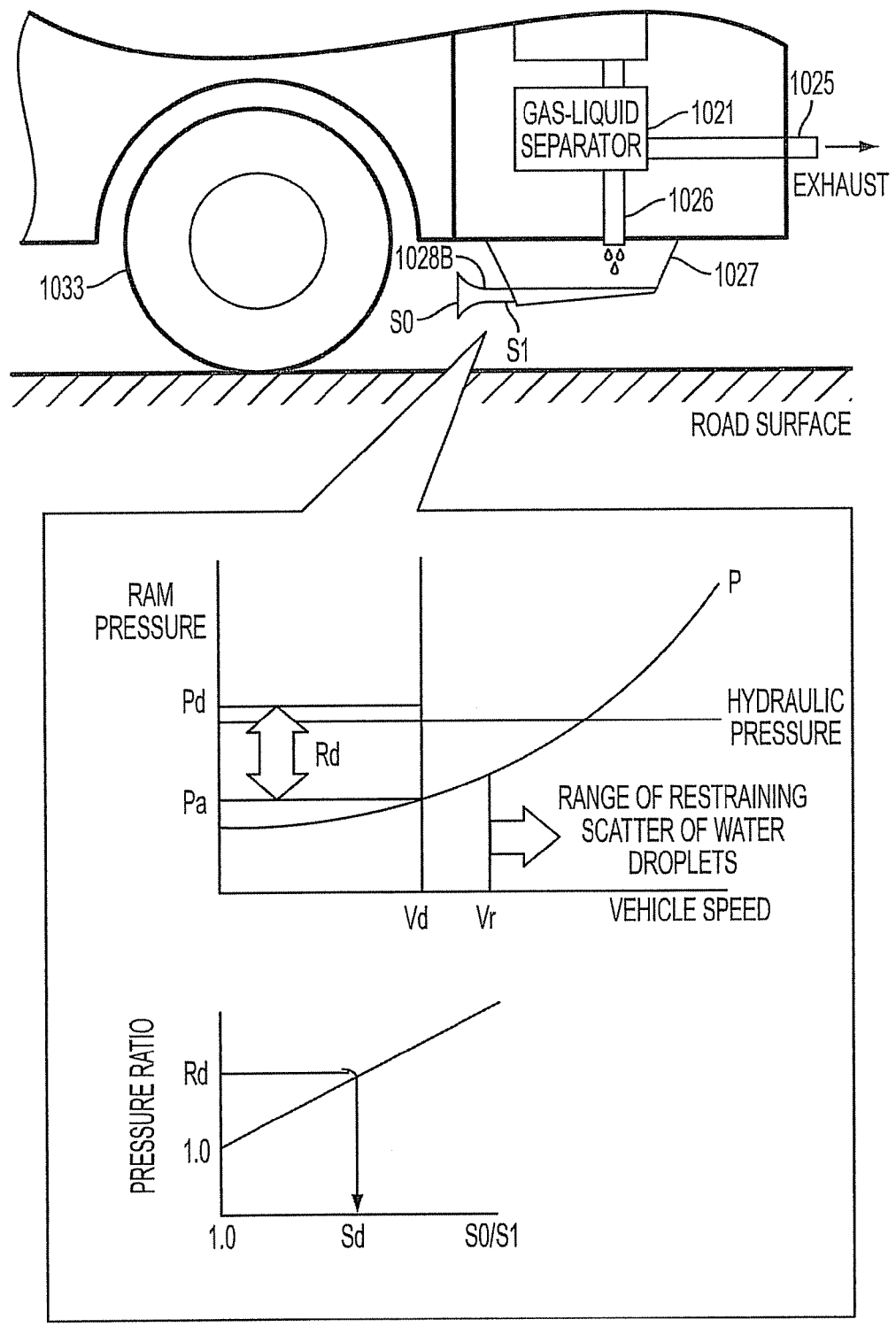
FIG. 43 shows the structure of still another exhaust system in another modified example.

FIG. 43 shows the structure of still another exhaust system in another modified example. In this modified example, a rigid discharge pipe 1028B having a front opening is attached to the buffer tank 1027. In the illustrated example, a sectional area S0 at the front opening of the discharge pipe 1028B is greater than a sectional area S1 at the joint with the buffer tank 1027. The discharge pipe 1028B may otherwise be formed in a cylindrical shape having the identical sectional areas S0 and S1.

In the structure of this modified example, the ram pressure is applied onto the discharge pipe 1028B during a run of the vehicle. The water accumulated in the buffer tank 1027 flows forward to be out of the discharge pipe 1028B. The ram pressure acts to restrain the flow-out. In the structure of this modified example, the action of the ram pressure effectively restrains the water discharge during a run at a high-speed.

Lower graphs show effects of a sectional area ratio S0/S1 on the restraint of the water discharge. It is assumed that the design speed Vd is set by taking into account the lower limit Vr of the vehicle speed that requires restraint of the water discharge, as discussed above with reference to the structure of the eighth embodiment. A curve P gives a ram pressure Pa corresponding to the design speed Vd. For restraint of the water discharge, the ram pressure Pa is to be higher than the hydraulic pressure of the water accumulated in the buffer tank 1028 for flow-out from the discharge pipe 1028B. The hydraulic pressure of the accumulated water varies with the level of the water accumulated in the buffer tank 1027, but may be set corresponding to the average level of the accumulated water under the typical driving conditions. The procedure of this embodiment sets a little higher value than this corresponding hydraulic pressure to a design value Pd of the ram pressure.

The pressure in a pipe generally varies with a variation in sectional area of the pipe. For example, setting the sectional area ratio S0/S1 of the discharge pipe 1028B to be not less than 1 raises the ram pressure at the joint of the discharge pipe 1028B to be higher than the ram pressure at the front opening. In this modified example, the shape of the discharge pipe 1028B is determined, based on a sectional area ratio Sd corresponding to a pressure ratio Rd (=Pd/Pa), where Pd denotes the design value of the ram pressure and Pa denotes the ram pressure corresponding to the design speed Vd. Regulation of the ram pressure thus effectively restrains the water discharge.

The embodiments discussed above regard automobiles with fuel cells mounted thereon as the power source. The automobiles may have any of other diverse power sources including secondary batteries and capacitors, in addition to the fuel cells. The techniques of the invention are not restricted to the automobiles with fuel cells mounted thereon, but are also applicable to diversity of ground moving bodies including trains, cars, and various vehicles in addition to automobiles, as well as to diversity of non-ground moving bodies.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The techniques of the invention are effectively applicable to manufacturing industries of diverse moving bodies including automobiles.

What is claimed is:

1. A moving body with fuel cells that are mounted thereon as a power source and generate electric power with production of water as a by-product, said moving body comprising:
 a water discharge module that releases water produced by the fuel cells from a water outlet to the atmosphere, wherein the water outlet is located behind a front wheel on a driver's lateral side of said moving body; and
 an air flow regulation module that extends from a front side of the moving body substantially parallel to a front-rear direction and bends toward the driver's lateral side near a rear end of the front wheel to a neighborhood of the water outlet and regulates an air flow caused by motion of said moving body in the neighborhood of the water outlet of said water discharge module,
 wherein the water outlet is arranged to release the water from the bottom side of said moving body substantially downward in a vertical direction, and
 said air flow regulation module makes the air flow obliquely backward to the driver's lateral side of said moving body, where the water outlet is located, thereby making the released water from the water outlet flow away from a longitudinal center of the moving body and away from the driver's lateral side of the moving body.

2. The moving body in accordance with claim 1, wherein said air flow regulation module makes the air flow backward at an angle in a range of 15 to 75 degrees relative to the lateral side of said moving body.

3. The moving body in accordance with claim 1, wherein said air flow regulation module regulates the air flow introduced from the front of said moving body.

* * * * *